Feb. 26, 1957 M. FOUASSIN 2,783,422
PRESET SERVO SYSTEM
Filed May 1, 1953 17 Sheets-Sheet 1

INVENTOR.
MARCEL FOUASSIN
BY
RICHEY, WATTS, EDGERTON & McNENNY
Frederic B. Schramm
ATTORNEYS

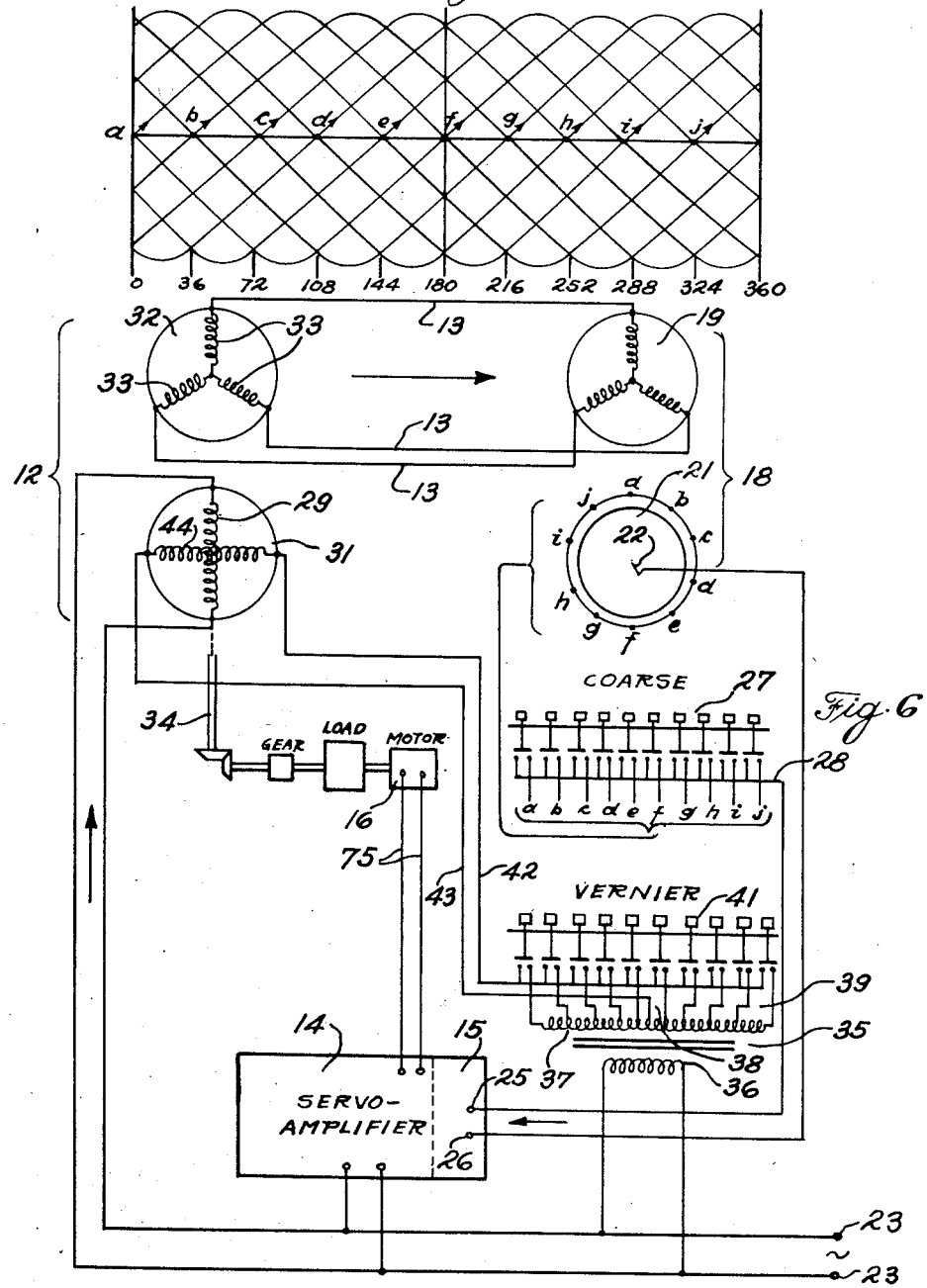

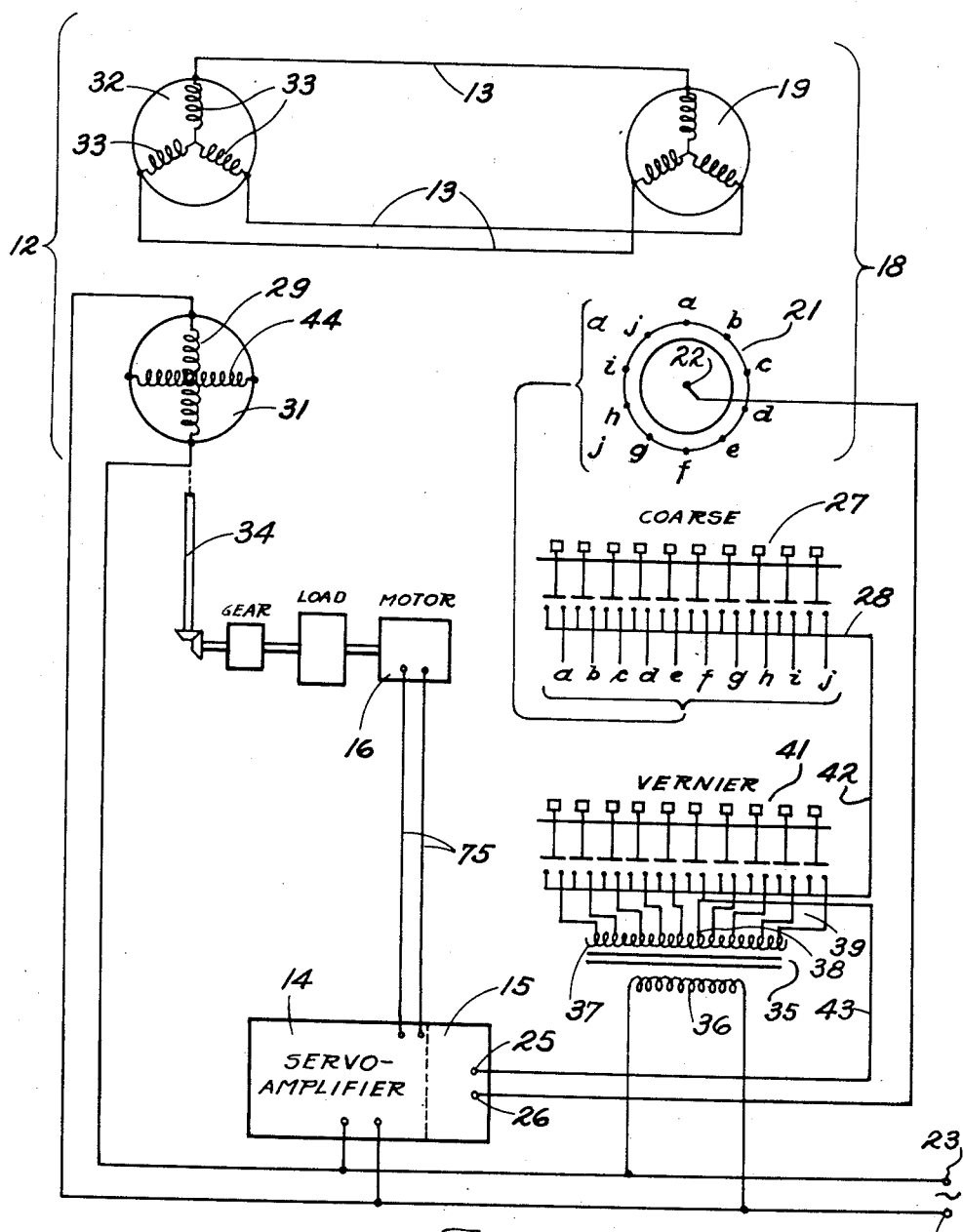

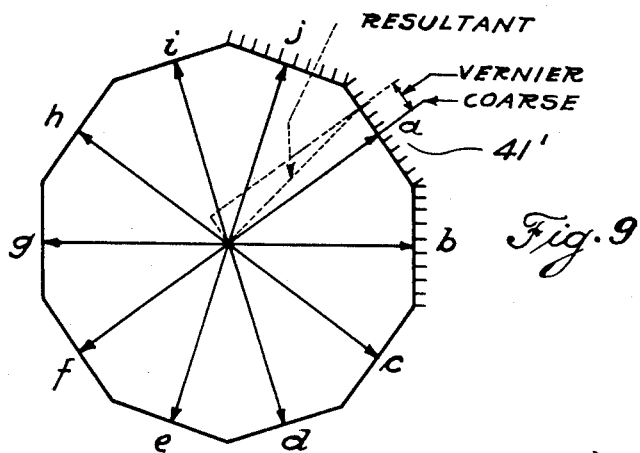
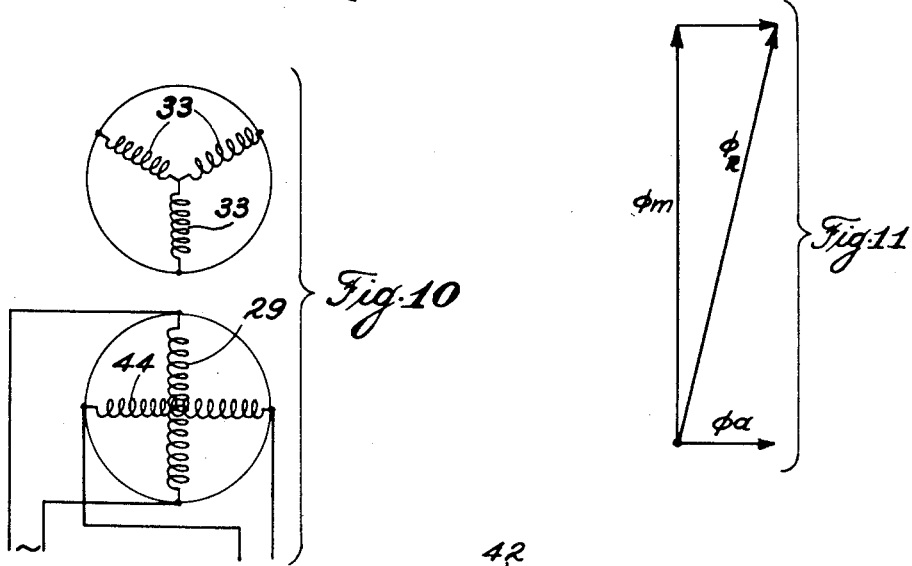
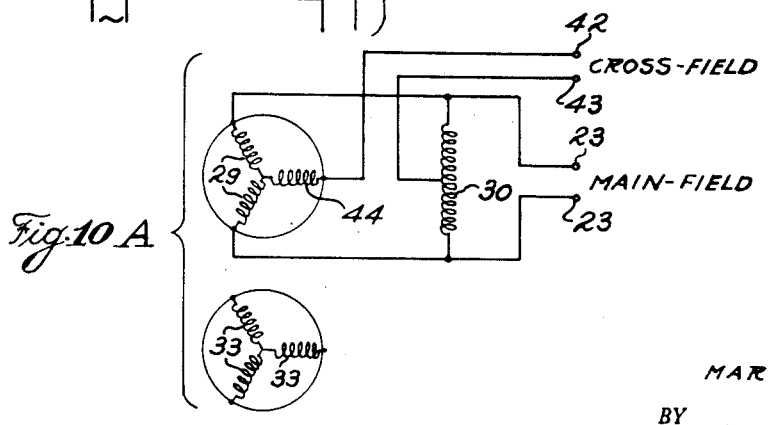

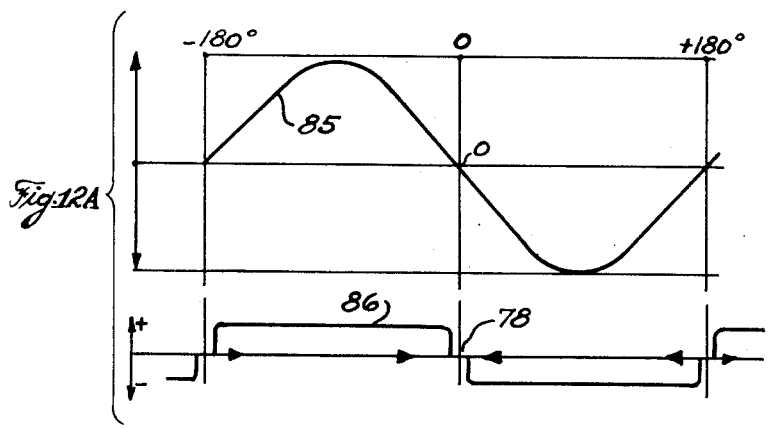
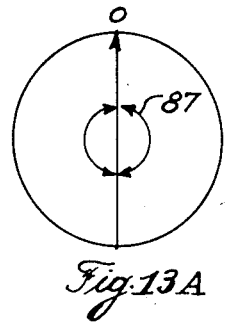
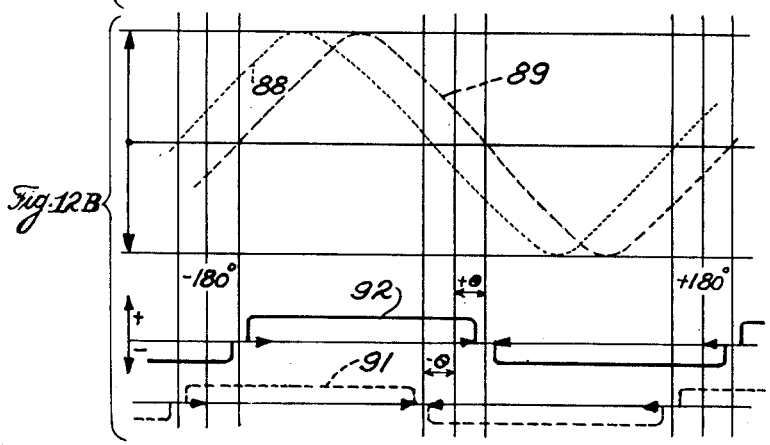
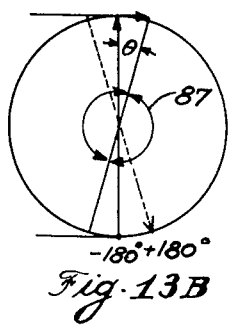
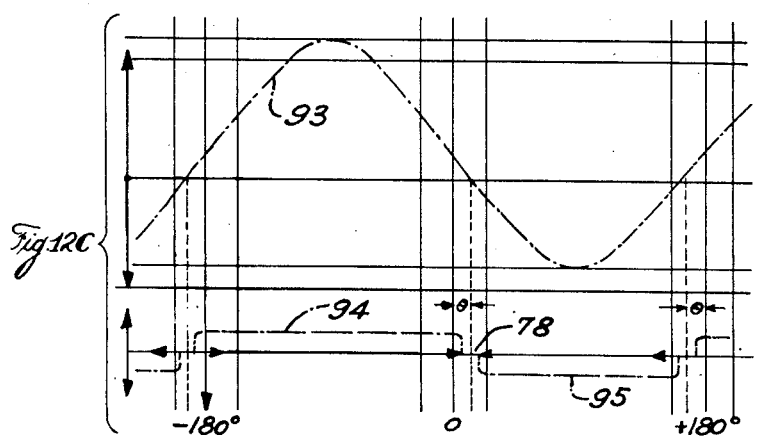
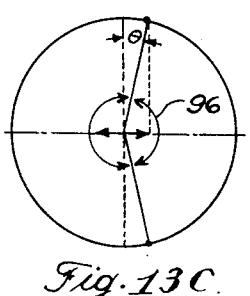

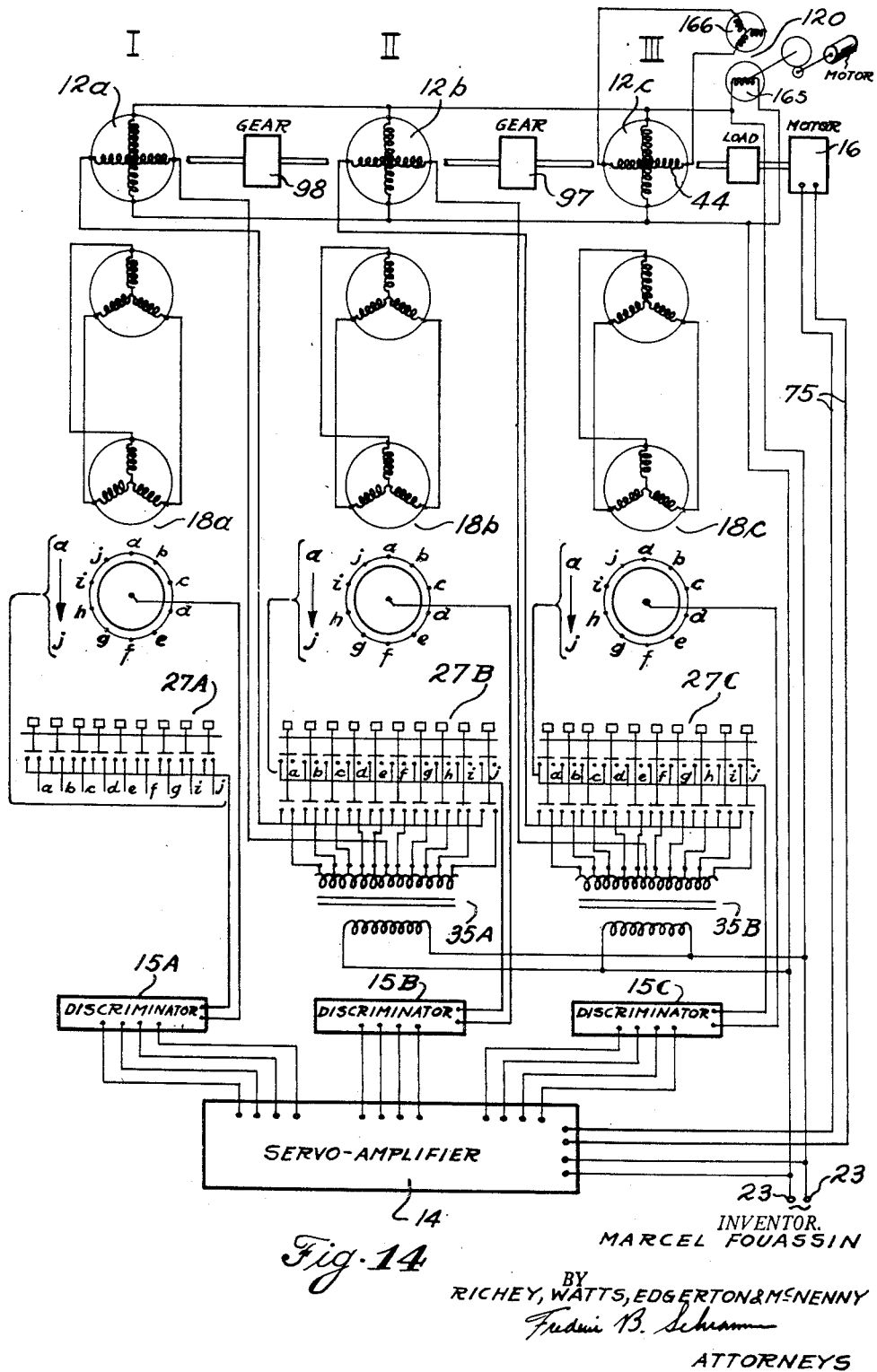

Feb. 26, 1957   M. FOUASSIN   2,783,422
PRESET SERVO SYSTEM
Filed May 1, 1953   17 Sheets-Sheet 8
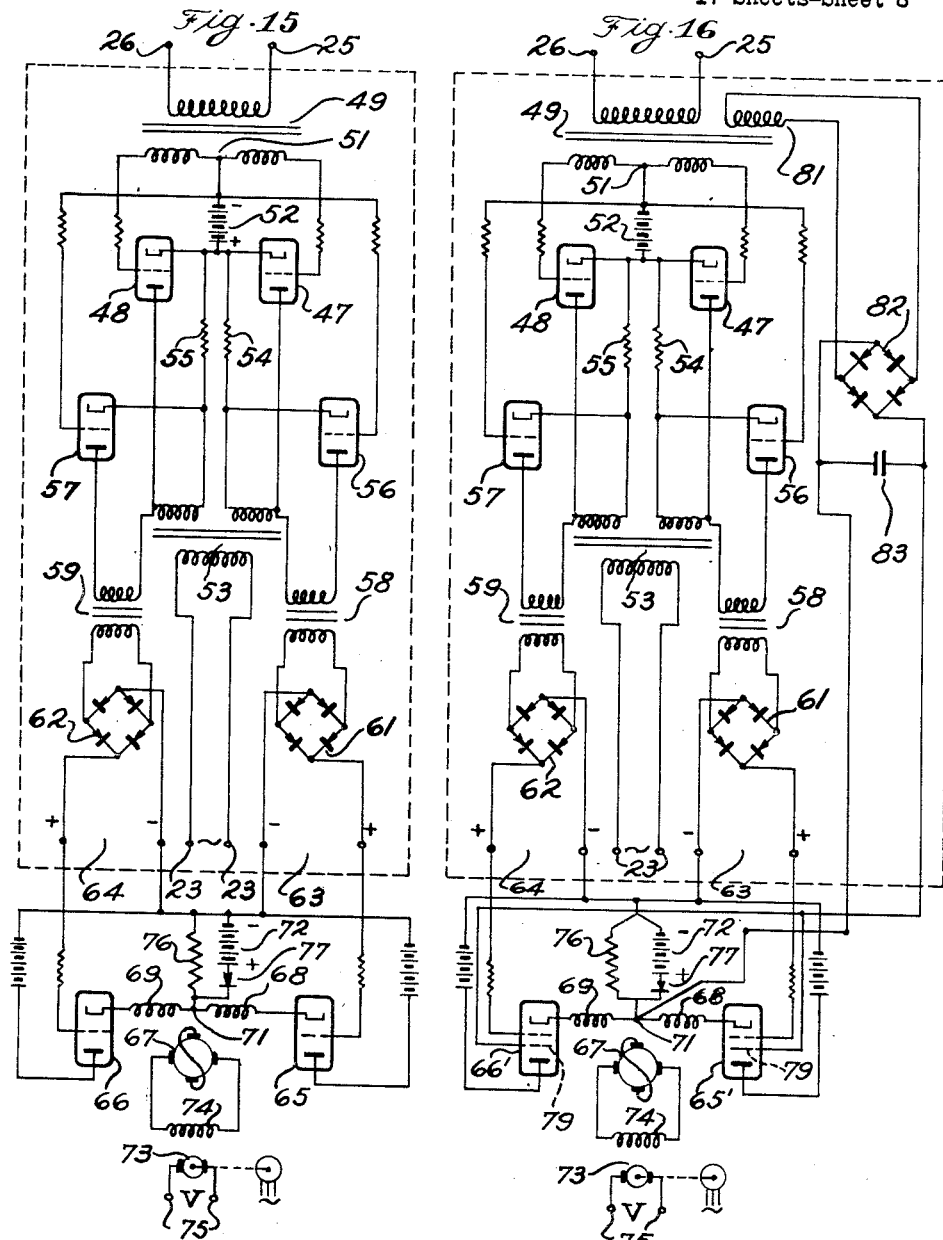
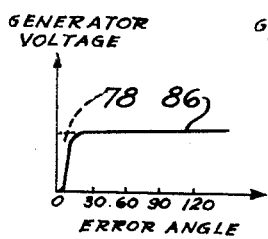
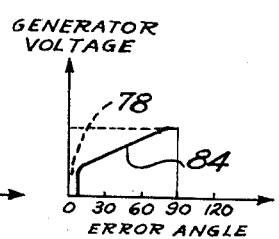
INVENTOR.
MARCEL FOUASSIN
BY
RICHEY, WATTS, EDGERTON & McNENNY
ATTORNEYS

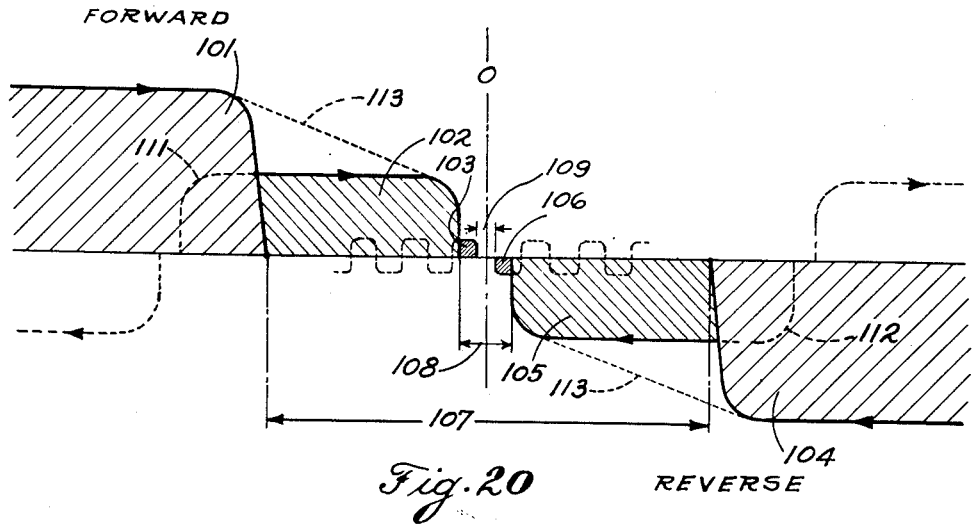
Fig. 20
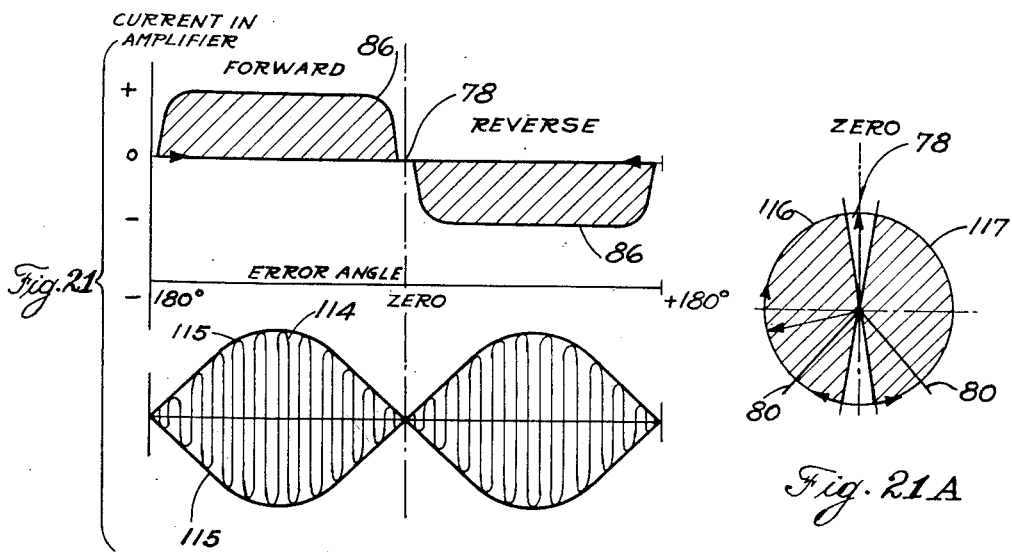
Fig. 21
Fig. 21A

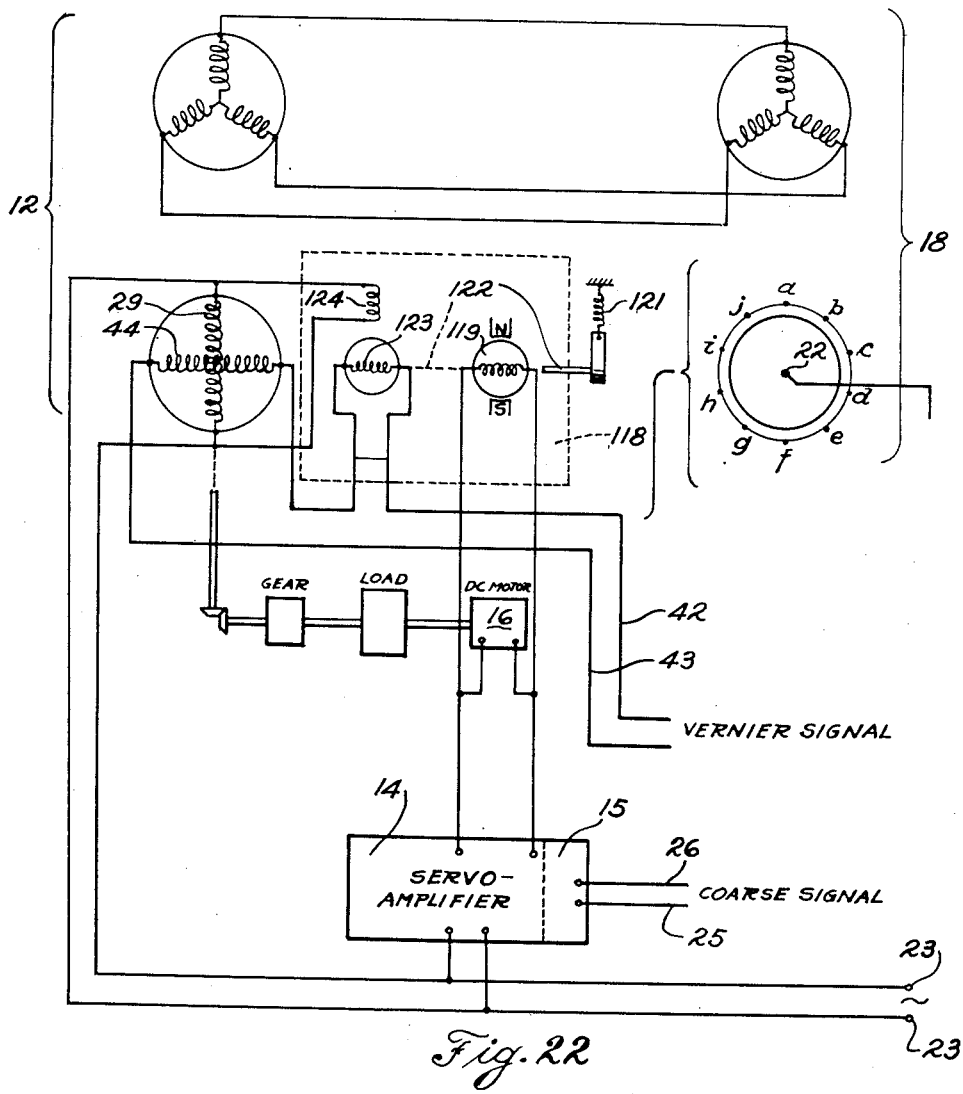
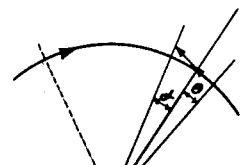
Fig. 22
Fig. 22A

Feb. 26, 1957 M. FOUASSIN 2,783,422
PRESET SERVO SYSTEM
Filed May 1, 1953 17 Sheets-Sheet 14

INVENTOR.
MARCEL FOUASSIN
BY
RICHEY, WATTS, EDGERTON & McNENNY
Frederic B. Schramm
ATTORNEYS Feb. 26, 1957  M. FOUASSIN  2,783,422
PRESET SERVO SYSTEM
Filed May 1, 1953  17 Sheets-Sheet 15
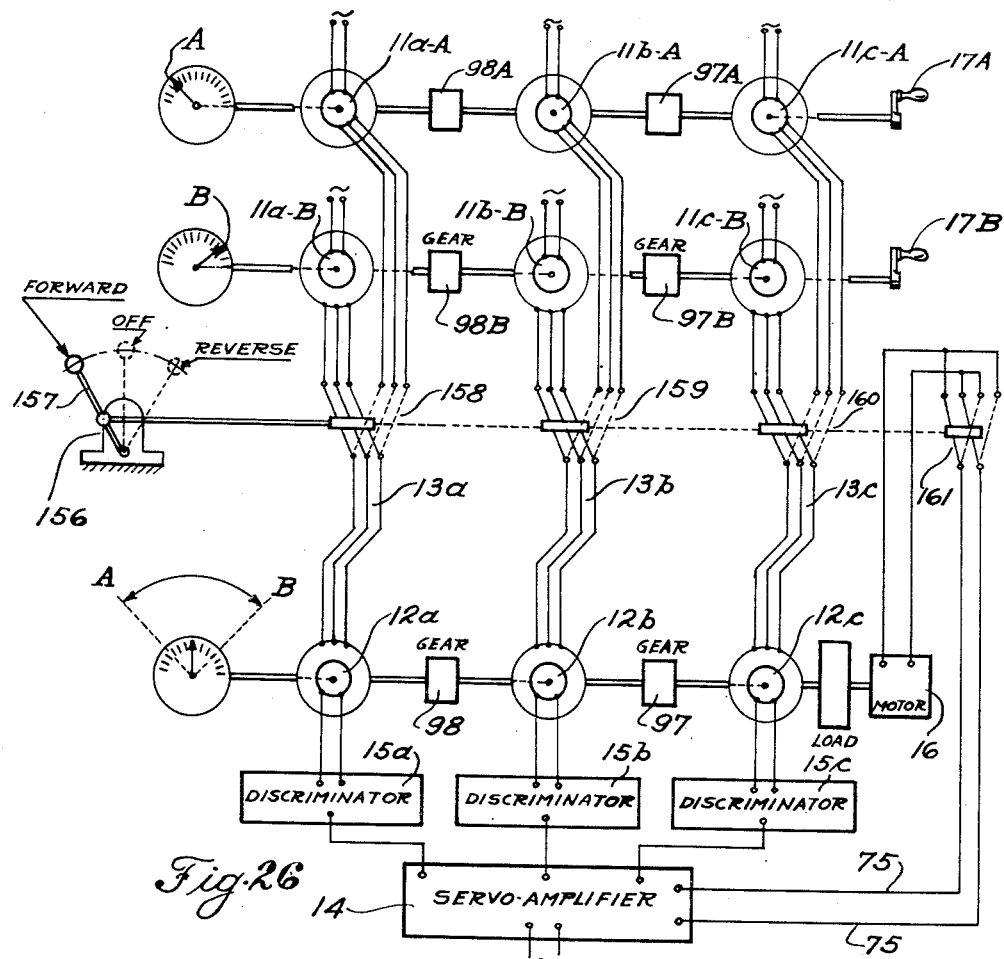
Fig. 26
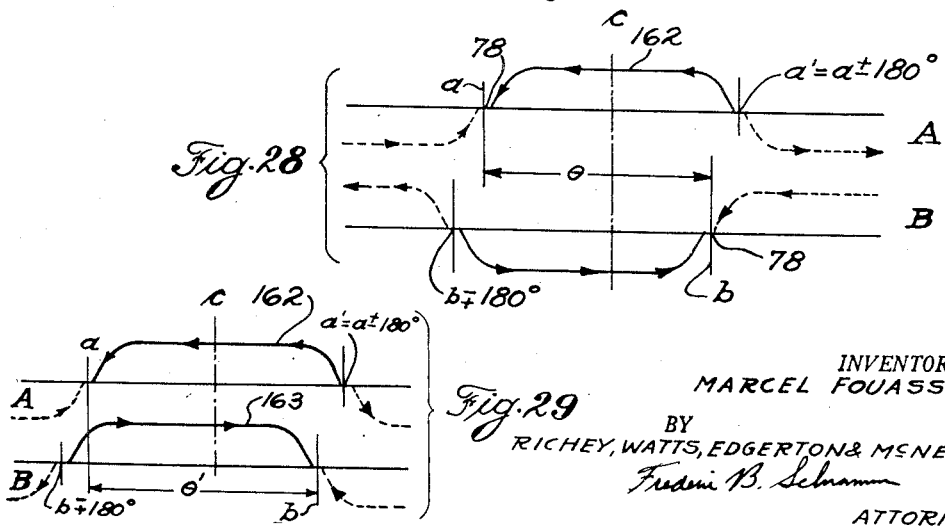
Fig. 28
Fig. 29
INVENTOR.
MARCEL FOUASSIN
BY
RICHEY, WATTS, EDGERTON & McNENNY
Frederic B. Schramm
ATTORNEYS Feb. 26, 1957   M. FOUASSIN   2,783,422
PRESET SERVO SYSTEM
Filed May 1, 1953   17 Sheets-Sheet 16

INVENTOR.
MARCEL FOUASSIN
BY
RICHEY, WATTS, EDGERTON & McNENNY
Frederic B. Schramm
ATTORNEYS INVENTOR.
MARCEL FOUASSIN
BY
RICHEY, WATTS, EDGERTON & McNENNY
ATTORNEYS

United States Patent Office 2,783,422
Patented Feb. 26, 1957

2,783,422
PRESET SERVO SYSTEM
Marcel Fouassin, Liege, Belgium

Application May 1, 1953, Serial No. 352,472

30 Claims. (Cl. 318—30)

My invention relates to remote positioning systems or follow-up systems particularly those employing servo-motors and amplifiers.

It is an object of my invention to provide a remote positioning system which may conveniently and reliably be employed with elaborate preset programs in which there may be a large number of different preset conditions. A further object is to avoid the need for a multiplicity of shafting where a large number of different preset conditions are desired.

Still another object of the invention is to provide a system in which presetting may be done by means of cross-bar connection boxes, IBM punch cards, step by step relays or the like or coils actuated by push buttons.

Still another object of the invention is to provide fine adjustment of an electric remote positioning system by means of push buttons or keys, which may be arranged in a decade or other suitable arrangement to facilitate quick, convenient and accurate setting.

Still another object of the invention is to provide improved remote positioning systems in which exceedingly fine position adjustment of heavy apparatus may be made by means of relatively light, small, compact control apparatus, employing light mechanical parts, and in which weak electrical currents are carried in the portion of the apparatus at the transmitting or control station.

Still another object of the invention is to provide rapid readjustment of the position from one angle to another through wide angles without sacrifice of precision or fineness of adjustment. A further object is to provide improved error anticipation and to overcome overshoot and hunting, as well as backlash effects.

Still another object of the invention is to provide high accuracy of stopping with requisite slow down as the preset position is approached to avoid overshoot. Moreover, it is an object to obtain such operation between preset limit switch positions.

It is also an object to provide a remote positioning system suitable for controlling a servo-motor utilizing motor-generator, contactor or other conventional types of power control.

Other and further objects, features and advantages of the invention will become apparent as the description proceeds.

In carrying out the invention in a preferred form thereof a self-synchronous type of motion transmitting system or synchrorepeater system is provided in which a multiphase transformer is employed for providing signals of desired space-phase in place of a rotary type transmitter selsyn or synchro-generator or the like. In order to obtain finer adjustment or intermediate points, a vernier arrangement may be employed for interposing a small voltage either in series with the signal or indirectly by means of a cross-magnetic field in the receiver selsyn or synchhorepeater. For finer adjustment a plurality of channels are employed, with a key board for each channel which selects the space-phase angle of multiphase transformer connection. The key board is provided also with contacts for introducing vernier voltages in the next succeeding or coarser channel. The system is preferably employed in conjunction with a servo-motor and amplifiers for transmitting large torques by light repeater units.

In order to avoid the disturbing effect of voltages generated in the finer channels during the plurality of rotations of the finer channel sesyns or synchrorepeaters, required for a large angular change of the coarse unit, blocking circuits are employed in the servo amplifiers so that a finer channel does not have any voltage generated in the corresponding amplifier channel until the shaft of the next coarser channel has come to a position approximating the desired coarser angle.

The amplifier circuits may be so arranged as to provide a flat response to the modulation voltage for different angular positions of the coarser channels with a dead space in the response curve sufficiently wide so that the finer channels may function, and of sufficient angular spread to avoid backlash effect. The angular spread of the output curve of each channel is somewhat less than 180° and is preferably of the same spread for both positive and negative error angles. Moreover, the spread of the output curve for the next finer channel is of such length that the commutation for the coarser channel takes place within the area represented by the response-curve spread of the next finer channel.

For anticipation of the angular movement, in order to minimize hunting and obtain a damping effect, an anticipation signal is supplied in suitable relation to the direction of motion and may be added to the vernier voltage, for example, in series with the vernier voltage applied to the cross-field in the circuit of the receiving selsyn. The anticipation signal may be produced by means of a D.-C. to A.-C. converter supplied by the direct-current voltage at the main direct current motor or corresponding voltage such as a tachometer voltage and supplying alternating current having a voltage varying in magnitude and polarity in relation to the D.-C. voltage.

The intermediate channel may be provided with a rising-response amplifier; the coarser and finer channels may be provided with flat-response amplifiers, whereby hunting is reduced to a minimum. In this manner relatively fast movement of the coarse adjustment may be obtained with a gradual response to the fine adjustment, and a quick and smooth transition from the coarse to the fine movement.

The system has the advantage of providing for gradual approach to two different preset conditions regarded as limits or end positions and avoidance of overshoot in the approach to such positions and may be applied to conventional reversing master control switches. The system also provides for the fine channel a favorable alteration of the response curve of the whole mechanism around the final position.

If desired, a modulated alternating current may be applied to the cross-field winding in the finest channel selsyn transmitter for the purpose of overcoming the effect of residual magnetism which would tend otherwise to cause the shaft of the finest channel selsyn to oscillate back and forth in order to produce sufficient control signal to overcome the residual magnetism. The modulation frequency should exceed the frequency of the natural vibration of the system being, however, only a fraction of the carrier frequency, which in ordinary steel mill system would be 60 cycles.

A better understanding of the invention will be afforded by the following detailed description considered in conjunction with the accompanying drawings, in which Fig. 1 is a schematic diagram illustrating for comparison a conventional form of remote positioning system employing selsyn units or synchrorepeaters in conjunction with a servomotor and servo amplifier;

Fig. 5 is a space-function voltage diagram illustrating the principle of operation of a multiphase transformer and illustrating the space-phase relation of voltages for different taps, voltages being plotted as a function of position;

Fig. 6 is a circuit diagram (schematic in part) illustrating one embodiment of my invention for remote positioning with both coarse-adjustment connecting switches and push buttons or keys and vernier connecting switches and push buttons or keys for fine adjustment, serving also as an illustration of connections in one channel of my multi-channel remote positioning system;

Fig. 8 is a circuit diagram corresponding to Figs. 6 and 7 illustrating still another embodiment;

Fig. 9 is a vector diagram of a star-connected multiphase transformer winding illustrating the principle of operation as a control unit of the multiphase transmitter transformers shown in Figs. 3, 4 and 6 to 8;

Fig. 10 is a schematic diagram of a synchromotor or synchrogenerator unit such as may be employed in a system illustrated in Figs. 2–6 and 8;

Fig. 10A is a fragmentary diagram showing the manner of obtaining a quadrature effect from a three-phase rotor or stator;

Fig. 11 is a vector diagram illustrating in conjunction with Fig. 10 the principle of operation of the system of Fig. 6 in which a vernier adjustment is introduced indirectly by vernier energization of a cross-field winding in a synchrorepeater unit;

Figs. 12A, 12B and 12C are graphs illustrating the principle of operation of the systems of Figs. 6, 7 and 8; Figs. 12A and 12B pertaining to the system of Figs. 6 and 7 and 12C pertaining to the system of Fig. 8;

Figs. 13A, 13B and 13C are vector diagrams corresponding respectively to Figs. 12A, 12B and 12C representing the characteristics thereof vectorially;

Fig. 14 is a circuit diagram, partially schematic, illustrating a multichannel remote positioning system capable of being preset, employing channels such as one of the embodiments illustrated by Figs. 6, 7 and 8;

Fig. 15 is a circuit diagram of a discriminator which may form a part of the servo amplifier of Figs. 6, 7 and 8 or such as may be employed in the arrangement of Fig. 14;

Fig. 16 is a circuit diagram of a modification in the arrangement of Fig. 15 where a rising response curve is desired, instead of a flat response;

Fig. 17 is a graph illustrating the response curve of the circuit of Fig. 15;

Fig. 18 is a graph illustrating the response curve of the arrangement of Fig. 16;

Fig. 20 is a graph illustrating the relationship between the response curves of the amplifiers for different channels of a multi-channel system, whereby successively greater precision is obtained in the finer channels, backlash is avoided, false rotation of finer channels is prevented, and commutation at the desired angles is obtained;

Fig. 21 is a graph illustrating the relationship between the modulation of the alternating-current signal plotted against the error angle, and the response curve obtained in the flat response amplifier of Fig. 15; and Fig. 21A is the corresponding dead space diagram;

Fig. 22 is a circuit diagram of a form of anticipator which may be employed for preventing overshoot and dampening out hunting;

Fig. 22A is a vector diagram illustrating the principle of operation of the embodiment of Fig. 22;

Fig. 26 is a schematic diagram illustrating the manner of utilizing a driven-selsyn remote-positioning system for obtaining end limit switch effect with a servo amplifier in accordance with my invention;

Fig. 28 is a graph illustrating the principle of operation of the end limit switch system of Fig. 25;

Fig. 29 is a graph illustrating the principle of operation of the system of Fig. 26 in which a reversing master controller is employed;

Like reference characters are utilized throughout the drawing to designate like parts.

Figure 1:
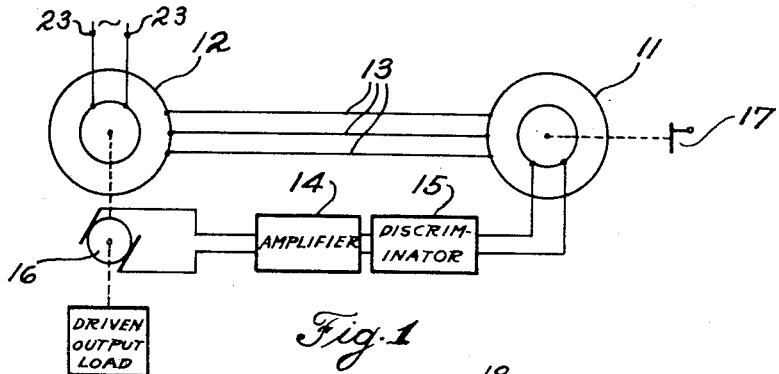

Referring to the drawings, the conventional servo system of the alternating-current, self-synchronous synchro-repeater type as illustrated in Fig. 1 consists of a selsyn or autosyn transmitter or synchrorepeater unit 11 at a control or transmitting station and a selsyn or autosyn receiver or synchrorepeater unit 12 at a controlled or receiving station. Each unit 11 and 12 constitutes a polyphase dynamo-electric device with a stator and a rotor one of which carries a polyphase winding, for example, a 3-phase winding, as indicated by the three interconnecting lines 13 and the other of which may also carry a polyphase winding, only one phase of which is ordinarily used, however, and for explanatory purposes may therefore be referred to as a single phase winding. Where relatively little torque need be produced at the controlled station, both single-phase windings may be connected to single-phase alternating-current terminals and the two rotors take up such a position that direction of magnetic-flux produced by the single phase windings is in the same relation to the polyphase windings in each unit. However, where greater torques are required and servomotors and amplifiers are needed, only one of the single-phase windings is connected to a source of single phase alternating current, and the other winding is connected to the input terminal of a servo amplifier 14 which must be phase sensitive, or have a discriminator represented separately by the box 15 in Fig. 1. There is a servomotor 16 ordinarily a direct-current motor for closer speed control purposes energized by the amplifier 14 and mechanically connected to the rotor of the synchrorepeater 12 at the controlled station. In this case, since the amplifier 14 is so arranged as to produce a signal and rotate the motor 16 whenever voltage appears at the single-phase winding connected to its input terminals, the system comes to rest with the rotors in such positions that the single phase windings are in quadrature with respect to their relationship to the polyphase windings.

The principle of operation of such a known system either with or without the servo amplifier and servomotor is well known to those skilled in the art and need not be explained further in detail, being discussed in such standard reference books as "Servomechanism Fundamentals" by Lauer, Lesnick and Matson, published by McGraw Hill Book Company in 1947. For example a synchrorepeater system without amplifier and servomotor is schematically illustrated in Fig. 2.10 on page 31 and servo systems with synchrofollow-up links are illustrated in Figs. 2.17 and 2.18 on page 37.

In carrying out my invention I avoid the necessity for the use of a synchrorepeater or selsyn transmitter with mechanically relatively rotatable elements at the controlling station and I utilize such a synchrorepeater unit only at one end of the system, viz. at the controlled station. As illustrated in Fig. 2 in one embodiment of my remote positioning system, at the controlling station I employ a stationary transformer 18 having a polyphase winding 19 shown for the sake of illustration as a three-phase winding, interconnected through three-phase lines 13 to the polyphase winding of the synchrorepeater unit 12. In inductive relation to the polyphase winding 19 there is another polyphase winding 21 which for the sake of convenient distinction, I shall hereinafter refer to as a multiphase winding. For reasons which will be apparent I prefer to have a greater number of phases than three in the multiphase winding 21; although, for the sake of minimizing the number of interconnecting conductors required, the polyphase winding 19 and the corresponding polyphase winding of the synchrorepeater 12 are preferably either two or three phase windings which require only three conductors, three phase windings having the advantage of more efficient utilization of space and material.

Figure 2:
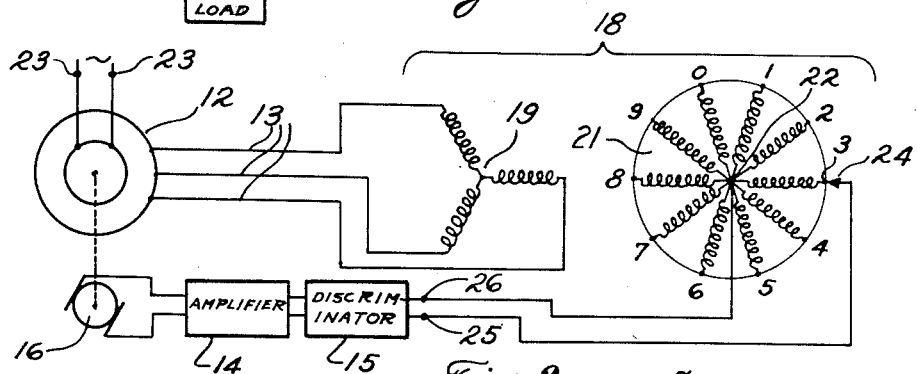
Fig. 2 is a simplified schematic diagram illustrating roughly one of the principles involved in my improved system.
Figure 3:
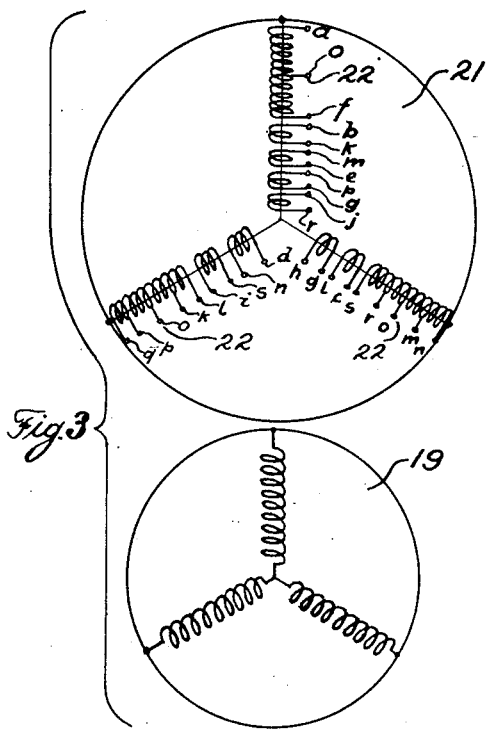
Fig. 3 is a schematic diagram of a multiphase-polyphase transformer or phase-multiplying transformer which may be employed in my system as the control signal source.

The multiphase winding 21 is so arranged as to have a plurality of tapping points designated 0 to 9, inclusive, in Fig. 2 for the sake of illustration, representing a 10-phase winding and having also a neutral point or connection brought out represented by the neutral terminal 22. In order that such a neutral point may be brought out a modified star connection is preferably employed. As it is well known to those skilled in the art, in polyphase transformers conversion from one number of phases to another may readily be obtained by suitable connections of windings where space-phase relationships between connection points differ by 30° or a multiple thereof. Other desired angular relationships may be obtained by tapping suitable intermediate points and using windings of appropriate different numbers of turns. For example, as illustrated in Fig. 3 conversion may be made from a three-phase winding 19 to a 10 phase winding 21 by interconnecting the windings and taps of the winding assembly 21 in the manner indicated by the vector diagrams of Fig. 4 which is a modified star connection having a neutral terminal 0 and terminals a, b, c, d, e, f, g, h, i and j differing successively by 36° in space phase. The numbers of turns between points of the windings designated in Fig. 3 correspond to the lengths of vectors between such points designated in Fig. 4.

It will be understood that if three-phase current were connected to the winding 19 the voltages at the points a, b, c, d, e, f, g, h, i and j would differ by 36° successively in time phase. The same angular space-phase relationship exists nevertheless since the power voltage appears at successive points 36° apart on the vector diagram and the concept of space relationship may therefore be employed in designating the connection points of a polyphase or multiphase winding. Since there is no polyphase energization, the concept of time phase relationship is not strictly applicable to the operation of the system. Accordingly, in the explanation hereinafter the reference to phase differences will be understood as signifying space-phase relationship.

In the system of Fig. 2 the single-phase winding of the synchrorepeater unit 12 is connected to a pair of single-phase alternating supply terminals 23. Adjustment of the angular position of the rotor is accomplished by selection of one of the phase points, 2, 3, 4, 5, 6, 9, 0 on the multiphase winding 21 by means of a tap 24 connected to one of the input terminals 25 of the discriminator 15, the other input terminal 26 being connected to the neutral terminal 22 of the multiphase winding 21. If the angular position of the rotor of this synchrorepeater 12 is such as to induce currents flowing in the lines 13, which are so distributed as to cause a voltage to appear between the terminals 3 and 22, it is an indication that the rotor position is not in the angular position corresponding to the tap 24. In such a case the amplifier and servomotor 16 are energized until the rotor of the synchrorepeater 12 has been brought to the position in which no voltage appears between the terminals 3 and 22. The operation of the discriminator, amplifier, servomotor and synchrorepeater 12 in the system of Fig. 2 is analogous to the operation in Fig. 1. Control is obtained in the system of Fig. 2 by the selection of the position of the tap 24 instead of the selection of the angular position of a handle 17 which controls the angular position of the rotor of the synchrorepeater unit 11 in Fig. 1.

The system of Fig. 2 may also be operated by connecting the discriminator input terminals 25 and 26 to the single phase winding of the synchrorepeater 12 instead of to the multiphase winding 21, and connecting the single-phase alternating current supply terminals 23 to the neutral terminal 22 and tap 24 of the multiphase winding 21 instead of to the single phase winding of the repeater 12. In that case the position of the tap 24 determines the relationship between the currents in the three-single phase windings 12 and accordingly determines the angular direction of the flux produced by the polyphase windings of the synchrorepeater 12 so that the rotor thereof is brought to the position in which the voltage induced in the single phase winding in the synchrorepeater 12 is zero, namely that normal or perpendicular to the direction of the alternating flux.

Inasmuch as remote positioning systems are employed primarily in cases where relatively large torques are required at the controlled station, for example, in steel mills for adjusting the screw-downs of the rolls, my invention has been illustrated and will be described in connection with the use of servoamplifiers and motors. However, my invention is not limited thereto and does not exclude the use of a multiphase winding such as 21 with the adjustable tap 24 and the neutral terminal 22 connected electrically directly to the single-phase winding of the unit 12 and to the single phase supply terminals 23. In this case the torque positioning the rotor of the synchrorepeater 12 would be supplied by the current flowing through the single-phase winding thereof and the rotor would come to the position in which the direction of the flux induced by current in the rotor was parallel to the direction of flux induced by current in the stator instead of normal thereto as in systems employing servoamplifiers and motors. In either case, however, movement of the adjustable selecting tap 24 from one point to the other on the multiphase winding produces rotation of the rotor of the synchrorepeater 12.

Figure 4:
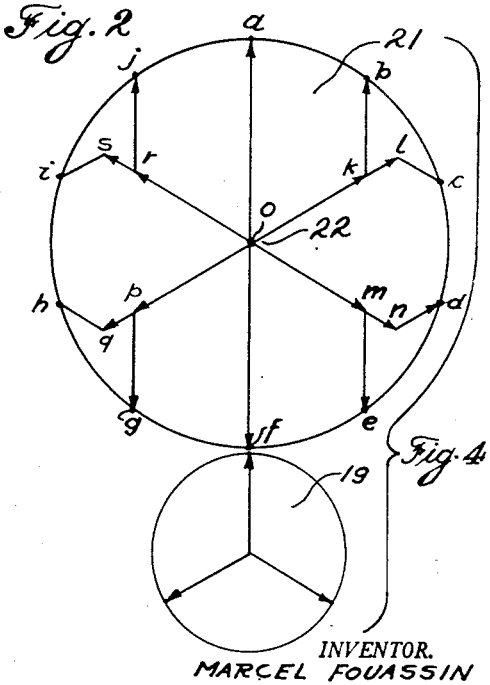
Fig. 4 is a vector diagram corresponding to Fig. 3 illustrating the connections which may be employed for producing a three-phase to ten-phase transformer in order to produce signals for ten different coarse positions.

Since it is impracticable to provide a multiphase winding with sufficient winding units to provide points of equal voltage differing in space phase by a very small angle, and also unduly expensive to provide a large number of taps or corresponding switches, keys or pushbuttons, a multiphase winding of the type schematically represented at Figs. 2, 3 and 4 is preferably used only to give relatively coarse positioning, for example, ten different points in the specific example given. I have found that intermediate points for finer positioning may be produced by introducing a vernier voltage as illustrated schematically in Figs. 6, 7 and 8.

Figure 7:
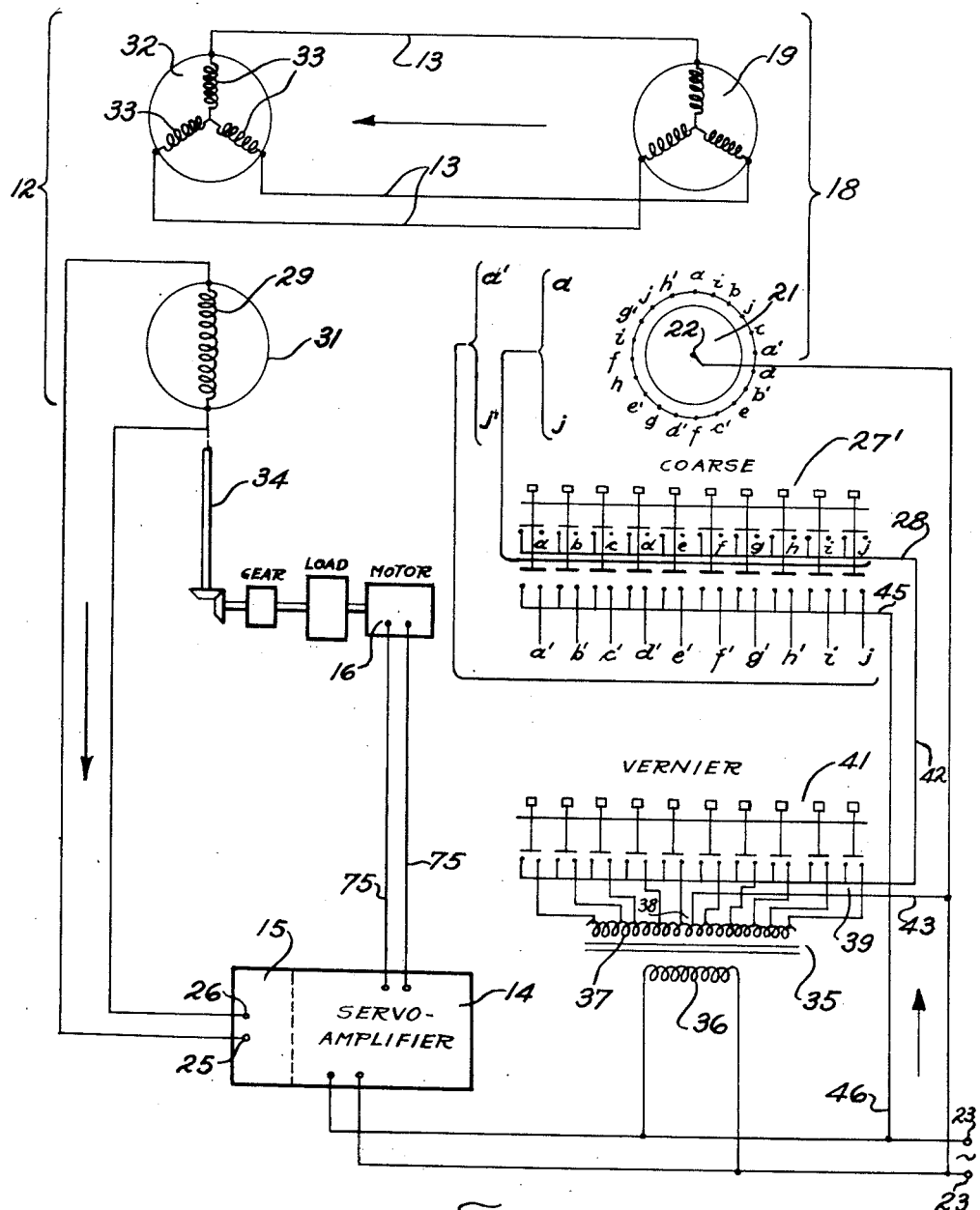
Fig. 7 is a circuit diagram corresponding to Fig. 6 showing another embodiment of the aspect of my invention represented in Fig. 6.

In Figures 6, 7 and 8 the same control transformer means 18 are employed as in Figs. 2 and 3. There is a polyphase winding 19, in this case a three phase winding and a multiphase winding 21. For the sake of simplicity the ten connections to the winding 21 have not been shown in detail and are indicated only schematically in Figs. 6, 7 and 8. For selection of the connections, instead of an adjustable tap such as the tap 24 in Fig. 2, a set of push buttons 27 is provided. In this case there are ten push buttons or keys each closing a contact between one of the phase connections $a$–$j$ and an output terminal 28.

In the embodiment of Fig. 6, a neutral terminal 22 and the adjustable space-phase terminal 28 of the multiphase transformer 21 are connected to the input terminals 25 and 26 of the discriminator 15 of the servo amplifier 14 and the single-phase alternating-current supply terminals 23 are connected to the single phase winding 29 of the synchrorepeater unit 12. The winding 29, for the sake of illustration, is assumed to be carried by the rotor 31 of the unit 12, the stator 32 carrying polyphase windings 33 which are interconnected by the conductors 13 to the polyphase winding 19 of the transformer unit 18. The servo-motor 16, energized by the servoamplifier 14, is mechanically connected through conventional gearing or shafting 34 to the rotor 31 of the synchrorepeater unit 12.

There is a single-phase vernier transformer 35 having a primary winding 36 connected to the single phase alternating supply terminals 23 and a secondary winding 37 with a center tap 38 and a plurality of taps 39 on either side of the center tap 38 providing voltages of two opposite polarities and different amplitude but of fixed phase relationship with respect to the alternating current supply at the terminals 23. The vernier voltages are therefore fixed in phase relationship with respect to the alternating-current in the system since this is also supplied from the input terminals 23. In the particular case illustrated, in Fig. 6, it is supplied through the single phase winding 29 of the synchrorepeater unit 12. A plurality of push buttons or keys 41 are provided, in this particular case, ten different push buttons for selectively closing connections to a vernier output conductor 42 from one of the selectable taps 39. A second vernier output conductor 43 is connected to the center tap 38. Means are provided for interposing a selected vernier voltage appearing at the conductors 42 and 43 in such a portion of the system as to deflect the balance of the system in one direction or the other sufficiently to cause resetting of the position of the controlled element to a point intermediate two of the coarse points, determined by whichever one of the coarse adjustment push buttons 27 is depressed.

In the specific embodiment of Fig. 6 the rotor 31 is provided with a second winding 44 which has a space phase relationship in quadrature with the exciting winding 29. The auxiliary or cross-field winding 44 is connected to the vernier voltage conductors 42 and 43 so as to produce a small magnetic field in the rotor 31 which has a magnitude, a fraction of that produced by the exciting winding 29. A resultant field is therefore produced in the synchrorepeater unit 12 deflected in one direction or the other depending upon the polarity of the voltage taken from the vernier transformer winding 37. The effect is illustrated in the vector diagram of Fig. 11 where the vector $\phi_M$ is the flux produced by the exciting winding 29, and the vector $\phi_a$ represents the fractional-amplitude flux of the auxiliary winding or cross-field winding 44 which constitutes the vernier signal. The resultant of the two fluxes is represented by the vector $-\phi_R$. The effect, insofar as reaction between the stator and rotor of the synchrorepeater 12 is concerned, is therefore equivalent to that which would have been produced without the auxiliary winding flux if the rotor had been rotated an angle equal to the angle between the vector $\phi_m$ and $\phi_r$.

Accordingly, the distribution of currents in the polyphase windings 33 of the stator 32 is determined by the angular direction of the flux $\phi_r$. This, in turn determines the distribution between the currents in the polyphase windings 19 of the transformer 18, and the distribution of voltages induced in the multiphase windings 21. This voltage distribution determines whether any voltage appears between terminals 27 and 28. In consequence, the servomotor 16 actuated by the servoamplifier 14 in the event of any voltage appearing between the terminals 27 and 28 causes the controlled member including the rotor 31 to rotate until a null effect has been achieved in the output connections 22 and 28 of the multiphase transformer winding 21.

The effect is the equivalent of deflecting the connection to the one of the radial vector or star points of the multiphase winding 21 to a point intermediate two connection points as illustrated symbolically in Fig. 9. Variation of the amplitude and polarity of the vernier voltage permits the selection of any one of the intermediate points as represented by the scale 41' in Fig. 9 where the letters $a$–$j$ inclusive represent coarse positions and the scale 41' represents fine positions within the 36° sector, bisected by the point $a$.

The theoretical relationship between windings of the synchrorepeater unit 12 is shown in Fig. 10. However, to avoid the necessity for obtaining special units with quarter-phase windings in the rotors, the connections of Fig. 10A may be employed, where a standard unit is utilized having three-phase windings on both stator and rotor. The "single-phase" winding 29 actually consists of two legs of the Y, connected across the source 23 for the arrangement of Fig. 6. A center tapped inductance 30 is also connected across the Y.

The cross-field or auxiliary winding 44 consists of the remaining Y leg and its external connections 42 and 43 are taken from the end of the Y 44 and the mid-point of the inductance 30.

The arrangement of Fig. 6 has the advantage of symmetry with connections of the utmost simplicity and avoidance of such slight errors as are represented by the variations in length of the radii along the straight sides of a polygon such as represented by Fig. 9. If desired, however, the voltage of a winding having a predetermined space phase relationship to the multiphase winding 21 representing the vectors of Fig. 9 may be interposed in the circuit of that winding to produce a vernier effect similar to actually tapping an imaginary point between two star points. Thus as illustrated in the embodiment of Fig. 7 the input signal connections 25 and 26 to the servoamplifier and the single-phase power-supply connections 23 to the exciting winding 29 of the rotor 31 of the synchrorepeater unit 12 are interchanged. In the arrangement of Fig. 7 the winding 29 is connected to the input 25 and 26 of the servo amplifier 14; and the multiphase winding 21 instead of the synchrorepeater winding 29 is connected to the single phase power supply terminals 23. The vernier voltage from the vernier transformer 35 is interposed in the connection from the power supply terminals 23 to the multiphase winding 21.

An extra set of connections for a coarse key board 27' is provided in order that the vernier voltage from the vernier voltage conductors 42 and 43 may be applied in space quadrature to the excitation of the transformer winding 21 from the single phase alternating current supply terminals 23. For each of the connecting points $a$–$j$ inclusive there is a connecting point in quadrature thereto identified by the primed letters $a'$ to $j'$ inclusive. Thus, when the key for point $a$ is pressed, the terminal 28 is connected to the point $a$ and a terminal 45 is connected to the point $a'$. Single phase alternating-current supply terminals 23 are in that instant connected to the neutral terminal 22 and the point $a'$ through the conductor 46 and the terminal 45, and simultaneously vernier voltage supply conductors 42 and 43 are connected to the neutral terminal 22 and the point $a$ through the conductor 42 and the terminal 28.

Figure 30:
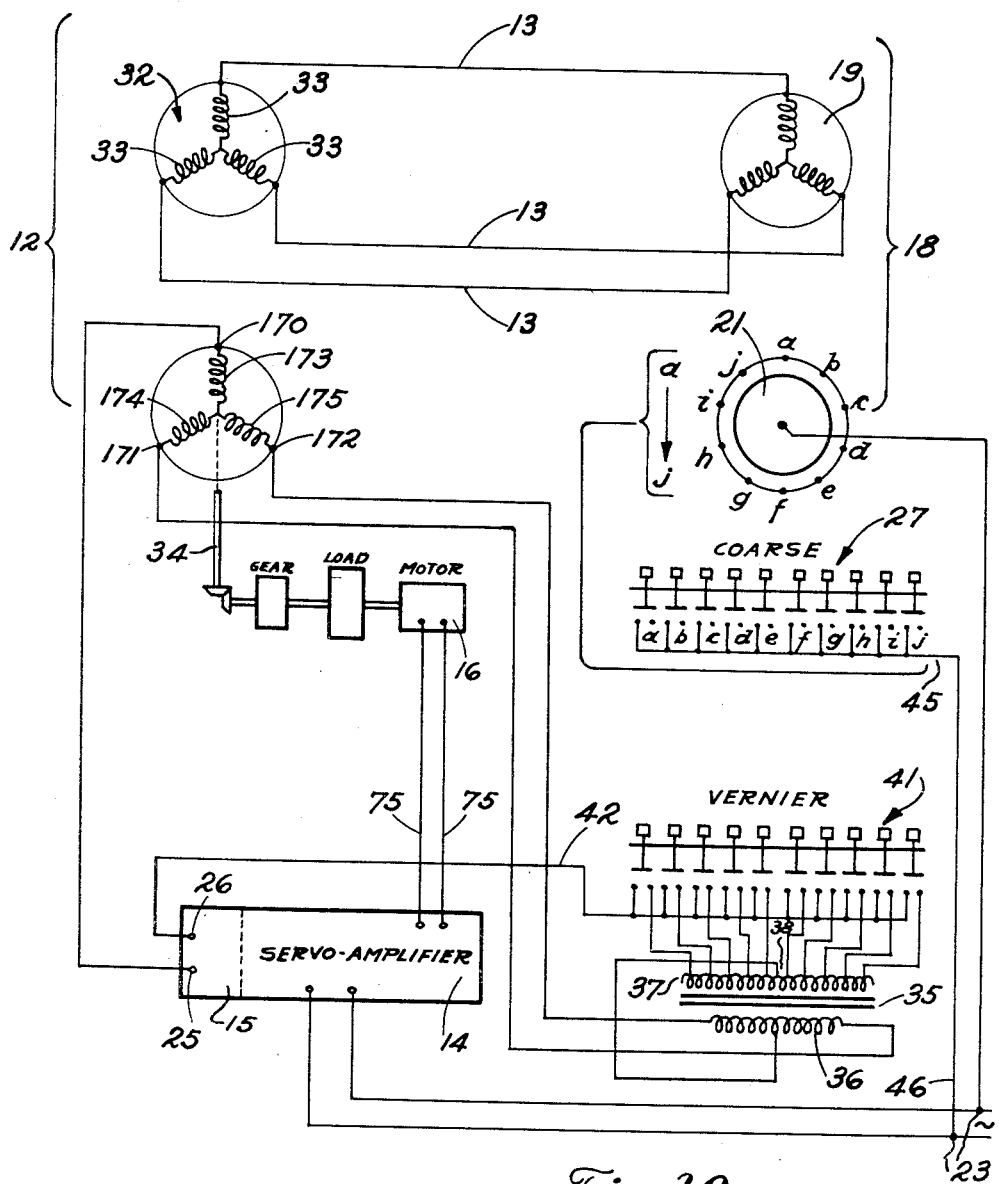
Fig. 30 is a circuit diagram corresponding to Figs. 6, 7 and 8 illustrating a modified embodiment thereof.

It will be understood, however, that various modifications of arrangements may be employed of which Figs. 6, 7 and 8 are only illustrative and the invention is not limited thereto. The invention does not exclude for example, an arrangement of Fig. 30 in which the vernier voltage is taken across windings 174 and 175 in series, acting as cross field windings and giving a cross field voltage between terminals 171 and 172 which is at its maximum value when the main field winding 173 is brought by the servomotor in quadrature with respect to the relationship to the polyphase winding. In this case the balance position is that in which the winding 173 is deflected sufficiently from the position having its magnetic axis perpendicular to the direction of the flux produced by the windings 33 so that the voltage induced by said winding counterbalances the voltage of the vernier transformer 35.

The vernier transformer may be interposed in the interconnecting lines instead of as shown in Figs. 6, 7, 8 and 30 if three contacts are employed for each position of the vernier. In this case an intermediate three-phase transformer is provided with additional windings and taps to provide a slight shift in changing the taps through a vernier keyboard. This corresponds to interposing a differential synchrogenerator rotated through a fractional angle but requires no shaft.

The system of Fig. 8 employs the same arrangements as the system of Fig. 6 except that the auxiliary winding 44 is left unconnected and the vernier voltage from the conductors 42 and 43 is connected instead in series with the input to the servoamplifier terminals 25 and 26 from the multiphase transformer terminal 28 and its neutral terminal 22.

In order to obtain a flat response to the error angle in the system, that is the difference between the angular position of the rotor of the synchrorepeater 12 and the angular position determined by the setting of the keys in the coarse and vernier keyboards 27 and 31, a discriminator such as illustrated in Fig. 15 is employed. The discriminator 15 has a pair of push-pull connected electric discharge devices 47 and 48, e. g. triodes, with input control electrodes coupled to the input signal terminal 25 and 26 with opposite polarities by a conventional coupling transformer 49 with a secondary mid-tap 51. The latter is connected through a bias voltage source represented as a battery 52 with the cathodes of the tubes 47 and 48, so as to provide negative bias for the devices 47 and 48. The plate supply to the devices 47 and 48 is through a double-secondary power tansformer 53 having cathode resistors 54 and 55 interposed in the cathode connections.

Second stage electric discharge devices 56 and 57, e. g. triodes, are provided which are cathode coupled to the first stage by connecting their cathodes to the negative ends of the cathode resistors 54 and 55 of the preceding stage. The devices 56 and 57 have control-electrode connections to a common negatively biased point, namely the negative terminal of the bias-voltage source 52, which is at the secondary center tap of the coupling transformer 49. The tubes 47 and 48 are biased to cut off so that only one or the other is conducting at any instant and the cut off bias is sufficient so that no plate current flows until a small predetermined error angle represented by a predetermined minimum input signal at the terminals 25 and 26 has been reached, as illustrated by the graph of Fig. 17. The discharge devices 56 and 57 are also biased to cut off and the constants are so arranged that the electric discharge devices operate through the range from cut-off to zero grid bias, high resistance grid resistors being provided to limit grid current, so that a flat response is obtained as illustrated in Fig. 17. The dead zone 78 is adjusted by adjustment of the grid bias 52, shown for simplicity as a battery. The output from the discharge devices 56 and 57 may be obtained through anode coupling transformers 58 and 59 to which full wave rectifier unit 61 and 62 are connected so that an output signal appears at one or the other of two pairs of output terminals 63 and 64.

A servo amplifier is provided comprising a pair of power electric discharge devices 65 and 66, e. g. triodes, each having a conventional anode supply and having a control electrode coupled to one of the pair of output terminals 63 or 64 of the discriminator 15. The electric discharge devices 65 and 66 also have connections such that the polarity of the output current is determined by whichever of the discriminator output terminals 63 and 64 is energized. In the specific arrangement shown the amplifier output is taken from the cathodes and a dynamo electric amplifier is utilized for obtaining further amplification. As shown there is a dynamo electric amplifier 67 of the amplidyne type having a pair of oppositely connected field windings 68 and 69, and a common terminal 71 connected to the positive terminal of a bias voltage source 72, the field windings 68 and 69 being connected in series with the cathodes of the amplifier devices 65 and 66, respectively. As in conventional amplidyne-controlled Ward Leonard systems there is a direct-current generator 73 having a field winding 74 energized by the amplidyne device 67 with a strength and polarity determined by the currents flowing in the amplidyne field windings 68 and 69. The Ward Leonard generator 73 has its armature connected to output terminals 75 serving as the output terminals of the servo amplifier 14 which are connected to the load-driving motor 16.

In order to permit the bias of electric discharge devices 65 and 66 to increase but not to fall below a predetermined level determined by the voltage of the source 72 a cathode resistor 76 is provided to which the source 72 is connected through a rectifier 77. In this manner the amplifier response is further flattened.

Where a response curve is desired having a dead section such as the area 78 of the graph Fig. 17 but with a linear rising characteristic instead of a flat characteristic a discriminator and power amplifier circuit such as that of Fig. 16 may be employed. In this case the discriminator is connected exactly as shown in Fig. 15. The power amplifier electric discharge devices 65 and 66 of Fig. 15, however, are replaced by devices 65' and 66' having two control electrodes instead of one. The corresponding control electrodes of the devices 65' and 66' are connected in the same manner as the single control electrode of devices in Fig. 15. For energizing the added control electrodes 79, however, a source of unidirectional control voltage proportional to the amplitude of the input signal is provided. For example, this may take the form of an additional winding 81 on the coupling transformer 49 of Fig. 15 to which is connected a full wave rectifier 82 with output terminals having a filter condenser 83 connected thereacross. The negative terminal is connected to the positive point of the bias supply source, e. g. at the positive end of the cathode resistor 76 of the servo amplifier devices 65' and 66', and the positive terminal is connected to the second control electrodes 79 thereof. Since the electric discharge devices of the circuit of Fig. 16 are biased to cut off in the same manner as Fig. 15, a dead area 78 is provided as in Fig. 17. However, as illustrated in Fig. 18, beyond this point there is a linear rising portion 84 of the output characteristic as a result of the rise of potential of the control electrode 79 with the increase in amplitude of the input signal.

The effect of the use of the multiphase control transformer illustrated as in Figs. 6 and 7 with a discriminator and servo amplifier of the type illustrated in Fig. 15 is explained by the graphs of Figs. 12A and 12B with the vector diagrams of Figs. 13A and 13B. In Fig. 12A the electric voltage representing error angle signal is plotted vertically and the error angle is plotted horizontally. In the arrangement of Fig. 7 where the single-phase alternating current supply is connected to the multiphase transformer winding 21, the error signal appears at the winding 29 of the synchrorepeater 12; in the arrangement of Fig. 6 where the single phase winding 29 of the synchrorepeater 12 is connected to the alternating current supply, the error signal appears between the terminals 22 and 28 of the multiphase transformer 21. In either case if the rotor 31 is deflected from its intended position the error signal or voltage is modulated sinusoidally with rotor rotation as illustrated by the curve 85, the polarity of the signal reversing as the error angle reverses.

One of the characteristics of the discriminator and amplifier is that the amplifier response at the terminal 75 follows the flat curve 86 of Fig. 12A with a dead zone 78. The amplifier response curve 86 has positive and negative loops corresponding to the positive and negative loops of the sine curve 85. Owing to the dead areas 78 the lengths of the positive and negative loops of the curve 86 are somewhat less than 180°. Accordingly, as illustrated in Fig. 13A, if the error of a synchrorepeater rotor should be any angle less than one-half the maximum spread represented by the positive and negative loops of the curve of 86 or the lengths of the arc 87, the system will immediately begin to rotate the load driving motor 16 to bring about a correction. It is unnecessary under such circumstances that the system be continuously connected and desired positioning may be obtained merely by pressing the desired push buttons or keys in the key boards 27 and 41 of Figs. 6, 7 and 8. Consequently the system lends itself readily to preset operations or elaborate programs where it may be desired to shift from one set of conditions to another, each of which is represented by preset connections which may be accomplished by means of selector switches or by step-by-step switches for successively connecting any one of a plurality of key boards such as 27 and 41 to the transformer taps on the transformer windings 37 and 21, or by means of punch cards successively actuating feeler switches and solenoids to depress the desired keys or push buttons of the key boards 27 and 41.

The transposition effect of the vernier signal or vernier voltage is illustrated by the graph of Fig. 12B. For example in the system of Fig. 6, if a vernier voltage is applied to the auxiliary winding 44 the resultant flux of the winding is deflected in one direction or the other as illustrated by the vector diagram of Fig. 11. Accordingly, depending on the polarity of the vernier signal, the angular position of the rotor at which the predetermined error voltage appears in the system is deflected in one direction or the other represented by the dotted sine wave 88 and the dashed line sine wave 89 of Fig. 12B. The flat amplifier response curves are also shifted in one direction or the other as represented by the curves 91 and 92 corresponding to the sine waves 88 and 89, respectively. The angular effect of the vernier voltage is represented by the angle $\theta$, the angular sector of response 87 of the system is deflected in one direction or the other by an angle $\theta$ as illustrated in Fig. 13B. The maximum angular spread 87 in which correction may be obtained without false reverse rotation of the rotor of the synchrorepeater unit is not changed in magnitude, merely being shifted by the angle $\theta$.

The curves of Fig. 12C and the vector diagram of Fig. 13C illustrate the principle of operation involved in connections such as that of Fig. 8 in which the vernier voltage is interposed in series with the input to the servo amplifier instead of being so applied as to deflect the resultant flux directly or indirectly in the synchrorepeater unit 12. This deflection of flux is done directly in the arrangement of Fig. 6 where an auxiliary winding 44 is employed and is done indirectly in the arrangement of Fig. 7 where the effect is transmitted through the multiphase control winding 21 and the polyphase windings 19 and 33 to the magnetic field structure of the synchrorepeater unit 12.

In an arrangement such as Fig. 8 in which the vernier voltage is interposed in series with the input to the servo amplifier, the response curve is not shifted through the angle $\theta$ corresponding to the vernier signal but instead one half loop is increased in length by this angular amount and the other half loop is decreased in length a corresponding amount. The effect of interposing the vernier voltage in series with the input of the servo amplifier is that of shifting the neutral axis of the sine wave 85 representing modulation of the error voltage so as to produce an unsymmetrical wave 93 as in Fig. 12C. Consequently, the amplifier response curve while remaining flat is caused to increase in length for a loop 94 of one polarity and to decrease in length for a loop 95 of the opposite polarity. There is still a dead space 78 between the loops of opposite polarity and consequently the angular spread 96 is illustrated in Fig. 13C, throughout which operation of the servomotor may be produced to correct the error, is reduced below 180° by $2\theta$ in addition to the dead space 78.

Where still finer adjustments are required, a plurality of channels may be employed, as represented in Fig. 14. Each channel may be of a type such as represented by one of the single channel systems of Figs. 6, 7 and 8. By way of example, they have been shown as having the connections of the specific embodiment of Fig. 6. A single drive motor 16, energized by the servo amplifier 14, is provided and gear reductions, represented by gears 97 and 98, are provided between successive synchrorepeater units. For example in a three-digit decimal system where it is desired to represent units, tens and hundreds, the gear ratios would be 1–10 with the coarse channel, channel I driven at the slowest speed, and with the load and the fine channel III being driven at the highest speed and directly connected to the drive motor 16. A plurality of discriminators 15A, 15B and 15C, one for each channel according to the number of channels, are provided, each having input terminals 25 and 26 connected as previously described in its own channel and having pairs of output terminals connected to power amplifiers as described in connection with Figs. 15 and 16. All of the power amplifiers, however, drive a single Ward Leonard system as illustrated in greater detail in Fig. 19.

The vernier key boards in the multichannel system, moreover, are not independent of the coarse key boards and are so arranged that the vernier connections for the coarser channels are automatically made by the keys or push buttons which make the multiphase control transformer connections for the next finer channel. For example, as illustrated in Fig. 14, in a system designed for 1000 different settings there is a coarse key board 27A with 10 keys for providing 10 different coarse settings representing hundreds, an intermediate key board 27B with 10 keys for producing 9 different intermediate settings and a zero setting, and a fine key board 27C with 10 keys for producing 9 different intermediate settings and a zero setting within the angular range represented by one of the keys of the key board 27B. However, the vernier transformer 35A for the coarse channel I is provided with contacts mounted so as to be closed by the keys in the key board 27B. Likewise the vernier transformer 35B for the intermittent channel II is provided with contact connections which are actuated by the push buttons of the units or fine channel key board 27C.

Figure 19:
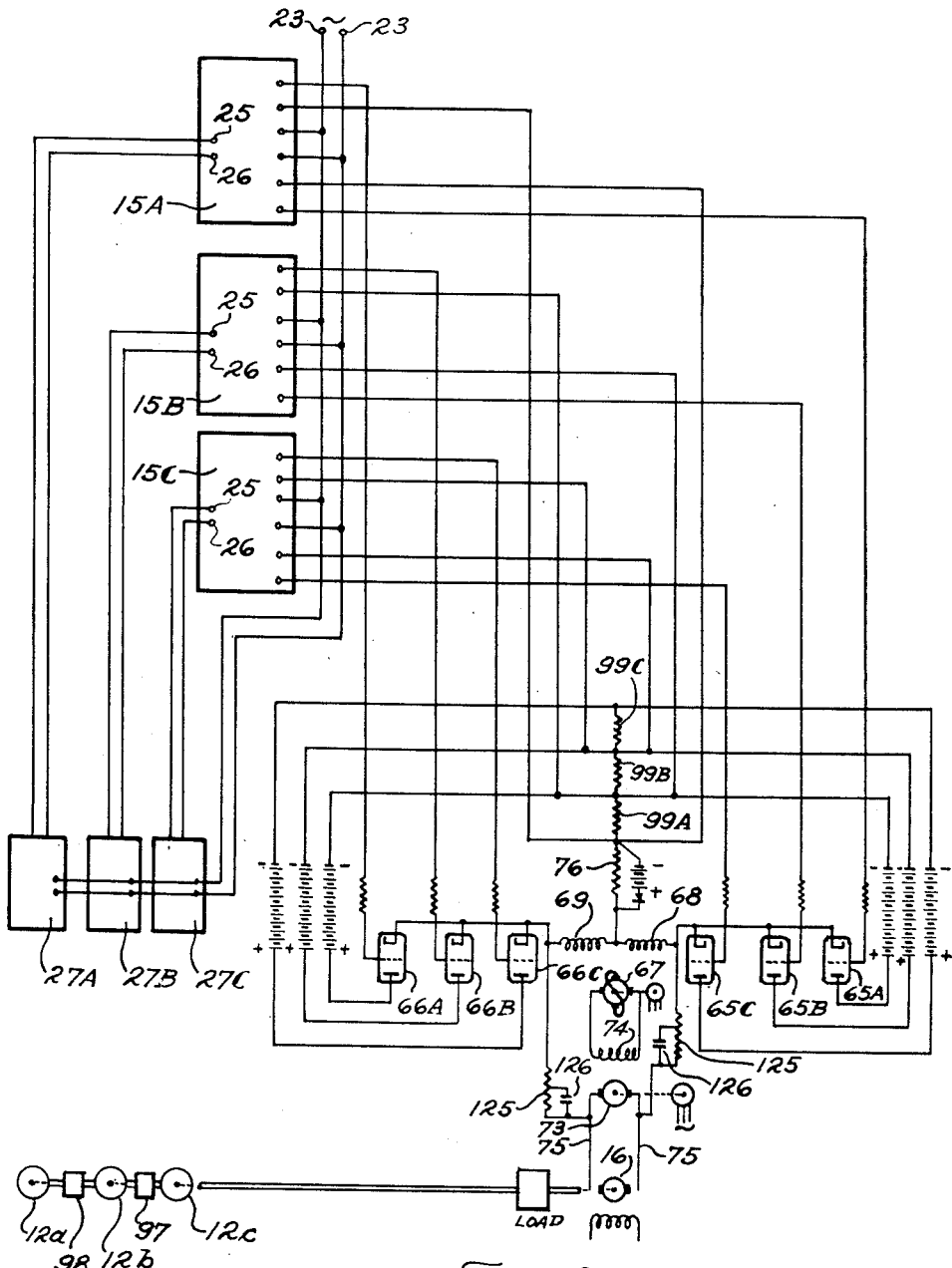
Fig. 19 is a circuit diagram illustrating in greater detail the power amplifier and discriminator connections of the system of Fig. 14.

As illustrated in Fig. 19 where a plurality of channels is employed, the power amplifier devices are cascaded with a common cathode bias resistor in Fig. 7 corresponding to the resistor 76 shown in Figs. 15 and 16 and a three section resistor 99 in series therewith, having the three sections designated 99A, 99B and 99C. The resistor 76 is common to the cathode circuits of all amplifiers, likewise the resistor 99A. The resistor 99B is common to the cathode circuits of the intermediate channel amplifier and the fine channel amplifier; wheeras the resistor 99C is included in the cathode circuit of only the fine channel amplifier so that successively greater cathode biases are provided for the increasingly finer channels. This may be called an invert cathode-follower circuit.

The constants are so chosen that when the coarse channel amplifier is within the operating range represented by the flat response loop 86 of Fig. 12A the cathode current is such that the bias provided by the resistor 99A blocks out the power amplifiers for the remaining two steps. It is only when the coarse adjustment synchrorepeater unit reaches the position within the angle represented by the dead space 78, in which the current in the coarse channel amplifier falls to zero, that the intermittent channel power amplifiers are permitted to carry current, assuming the grid control is such as to cause one or the other of them to conduct current. Likewise as long as one of the intermediate channel power amplifiers is conducting current, the fine channel amplifiers are blocked out and it is only after the intermediate channel synchrorepeater unit is in the approximate angular position desired, within its dead space also represented by the area 78 of its corresponding characteristic curve, that one or the other of the fine channel amplifiers is permitted to conduct current and effect control. For feed-back stabilization feed back resistors 125 partly by-passed by condensers 126 are provided.

The operation is explained in the graph of Fig. 20, wherein portions of the characteristic response curves corresponding to curve 86 of Fig 12A of three successive channels are superimposed. Since there is a 10-1 gear reduction between the angular motions of successive adjacent channels, when reduced to the same scale the angular spread of output curves for successive finer channels is successively less.

In Fig. 20 the portion 101 of the graph represents a portion of the response curve such as the curve 86 of Fig. 12A for the coarse channel and the coarse amplifier tubes 66A, 67A. The portion 102 of the graph represents the corresponding portion of the same type of response curve for the intermediate channel and the portion 103 of the graph represents the corresponding portion of the response curve for the finest channel, all for forward motion. Corresponding portions for reverse motion are the portions 104, 105 and 106 which correspond to the forward-motion response curves 101, 102 and 103 respectively. It will be observed that there is a dead space represented by the distance 107 between the coarse channel opposite-direction response curve signals 101 and 104. Likewise there is a dead space represented by the distance 108 between the curve portions 102 and 105, and a very small dead space 109 between the curve portions 103 and 106.

As shown by the dotted lines at 111 and 112, the upper portion 102 of the response curve for the intermediate channel would extend into the area represented by the portion 101 of the response curve for the coarse channel, except for the fact that as explained in connection with Fig. 19 the intermediate channel is blocked out and its amplifier supplies no current as long as current is flowing in the coarse channel amplifier as represented by the response curve 101. However, this overlap in area represented by the two response curves 101 and 102 provides for overcoming any effect of back lash so that the next finer channel is ready to take over control as soon as the motor has moved the load to such a position that the coarser channel amplifier has reached its dead space. There is a similar relationship between the intermediate channel and the finest channel represented by the response curve portions 102 and 103.

The amplitudes of the curves 101, 102 and 103 represent the magnitudes of the outputs of the servoamplifiers and therefore the voltages of the current supplied to the load driving motor 16. Accordingly, the speed of the load driving motor 16 is approximately represented by the amplitude of the respective response-curve portions 101, 102 and 103. Thus a step-wise reduction in speed is obtained as the load is brought successively closer to the exact position for which the key boards 27A, 27B and 27C have been set. In many applications this is a preferred arrangement. In some cases it may be desired to effect a smooth transition in speed from the fast setting provided by the coarse channel to the gradual approach to precise setting provided by the fine channel. In such a case the intermediate channel or channels, if there are more than three channels, may be provided with rising response curves such as represented by the curve 84 in Fig. 18. This is done by the utilization of the discriminator and power amplifier circuit of Fig. 16. In such a case the transition from the response curve 101 to 103 of Fig. 20 follows the dashed line 113 or a corresponding dashed line 113 from curves 104 to 106 for the reverse movement.

In Fig. 21 the response curve 86 for one of the amplifiers is compared with the voltages generated in whichever end of the system is applied to the discriminator input terminals 25 and 26. It will be observed that the actual induced voltage is of the frequency of the source connected to terminals 23, e. g. a 60-cycle voltage. This is represented by a modulated wave 114. The wave has a modulation envelope 115, substantially sinusoidal, which varies from zero to a maximum and again to zero as the error angle varies from 0 to 90° and on to 180° in either direction from the zero position plotted along the horizontal axis. For reasons already explained, however, there is a small angle on either side of the zero error angle position in which the system is stable and the response curve 86 remains at zero forming what has been referred to as the dead space 78. As illustrated in the diagram in Fig. 21A the dead space is represented by the angle 78 within the shaded portion 116 of the diagram representing the limit of error angles in which a correct and immediate response may be obtained in the forward direction. The shaded area 117 represents the limit of error angles within which correct response may be obtained in the reverse direction. It will be understood that in practice, back-lash inaccuracy of the dead zone of the coarse signal prevents use of a portion of the shaded area, e. g. between the radii 80. If the error angle should exceed 180°, say 270° in the rotor of the finest channel synchrorepeater unit this unit would tend to produce signals causing rotation in the wrong direction to bring the load to the correct position. Inconsistent signals would then issue from different channels. It is for that reason that the blocking circuit as explained in connection with Fig. 19 is used.

The system of Fig. 6 in which the vernier voltage is applied in an auxiliary or cross-field 44 in the synchrorepeater unit 12 as well adapted to provision of means for dampening out hunting by introduction of anticipation signals. As illustrated in Fig. 22 an anticipating anti-hunt unit 118 may be provided which is interposed in series with the vernier signal derived from the conductors 42 and 43. The anti-hunt unit 118 comprises a direct-current to alternating current inverter, inasmuch as the servo amplifier 14 supplies direct current to the load driving motor 16. My invention is not limited to a specific form of direct current to alternating current inverters and does not exclude such devices as magnetic amplifiers or saturable reactors, but in the form shown the inverter may consist of a direct-current torque device 119 such as a direct-current voltmeter movement or a direct-current voltage-responsive relay unit biased to a neutral position by a biasing spring 121 having a shaft 122 carrying an A.-C. voltage pick-up unit 123 mounted within the field of a winding 124 excited by the single phase alternating supply terminals 23 and shown as connected across the winding 29 of the synchrorepeater unit 12. The voltage pick-up coil 123 is so mounted on the shaft 122 that its magnetic axis is perpendicular to the axis of the flux of the winding 124 when the shaft 122 is in the neutral position to which it is biased by the spring 121. The direct-current voltage-response unit 119 may be connected across the input to the direct-current motor 16 or across any other suitable pair of terminals at which a unidirectional voltage appears proportional to the speed of the direct-current motor, for example, to terminals of a tachometer generator. The shaft 122 will accordingly deflect increasingly as the speed of the motor 16 increases, thereby causing a voltage to be induced in the coil 123 which is also dependent upon the speed of the motor 16. The winding 123 is so connected in series with the vernier conductors 42 and 43 that the induced voltage is of the proper polarity to produce an effect opposing that of the error voltage, appearing in the particular arrangement of Fig. 6 between the terminals 22 and 28, and applied to the input terminals 25 and 26 of the servo amplifier 14. Accordingly, as illustrated in the vector diagram of Fig. 22A the angular shift $\theta$ of the direction of the magnetic flux in the synchrorepeater unit 12 produced by the vernier signal 42—43 is combined with an angular shift $\alpha$ produced by the current from the winding 123, thereby causing an anticipating signal which causes the drive motor 16 to slow down as it approaches the position for which the controls are set. The anticipating signal becomes progressively weaker as the desired position is more and more closely approached.

The A.-C. voltage such as from the winding 123 is applied in full magnitude to the intermediate channel in the case of multichannel systems, and reduced in the ratio of one to 10 in each next coarser channel. In this manner the same commutation point is retained between two succeeding channels. The anticipation is not required in the finest channel where the speed is low enough to stop without overshooting.

Theoretically, the greatest precision is obtained in multichannel systems by applying vernier voltages from the finer channels to all the coarser channels instead of to only the next coarser channel. For example in Fig. 14, in addition to the vernier voltage applied to the cross-field winding 44 of unit 12a, from the intermediate channel a second vernier voltage may be applied from the fine channel, reduced through a 10:1 step down transformer. However, this is not necessary in practice, because such a small signal can be disregarded as beyond the accuracy of most synchrorepeater units.

In the case of speed anticipation on the other hand, the signals in question may be much larger and should not be disregarded.

In cases where there is a fixed back-lash in the mechanical parts of the system which it is desired to compensate, this may be accomplished by applying an alternating voltage of constant value in a suitable portion of the electric circuits. For example in the arrangement of Figs. 6 and 7, this may be accomplished by introducing another voltage in series with the vernier signals in the line 42 which is of such a constant value as to produce the same shift as the angle of back-lash to be compensated.

In the multichannel system of Fig. 14 provision for utilizing a vernier signal has not been shown in the finest channel. Nevertheless, this channel could be arranged as shown in Fig. 6 to provide smaller increments. For simplicity the auxiliary or cross-field 44 of the synchrorepeater 12 in the finest channel is used for another purpose. One of the problems present in remote positioning apparatus utilizing ferrous-core dynamo electric units is the residual magnetism of the core, which produces a fixed magnetic field remaining after the positioning signal currents should have fallen to zero. This results in a disturbing flux even after the drive motor 16 has brought the apparatus to the angular position for which control keys are set. A hunting condition comes about, for which no type of anti-hunting compensation such as anticipating circuits is available. I have found that this type of hunting may be overcome by applying an alternating current having a low frequency modulation to the fine channel synchrorepeater unit and I make use of the auxiliary winding 44 for this purpose by connecting it to an alternating-current source 125 (Fig. 14) having the frequency of the source 23 modulated at a low frequency in comparison with the frequency of the voltage supplied to the input terminals 23. This modulating frequency should exceed the frequency represented by the natural vibration of the system but be only a fraction, preferably not more than ⅓, of the frequency applied to the single-phase supply terminals 23. Such a modulated signal is easily provided by means of a selsyn unit 125 having its rotor driven slowly, with a rotor winding 165 connected to A.-C. source 23 and a signal taken from the stator 166 and applied to the winding 44 in the unit 12c of the fine channel.

The low frequency modulation signal from the source 125 has the effect of shifting the response curve 103—106 of the finest channel back and forth along the horizontal axis. This straightens out the dead zone 109 between positive and negative loop 103 and 106 of Fig. 20, because of the slower response of the cascaded amplifier and motor-generator set. Thus a smooth stop is provided. The dead zone necessary to avoid hunting is provided by the friction of the load and eventually by the brake which may be controlled by the finest channel.

Figure 23:
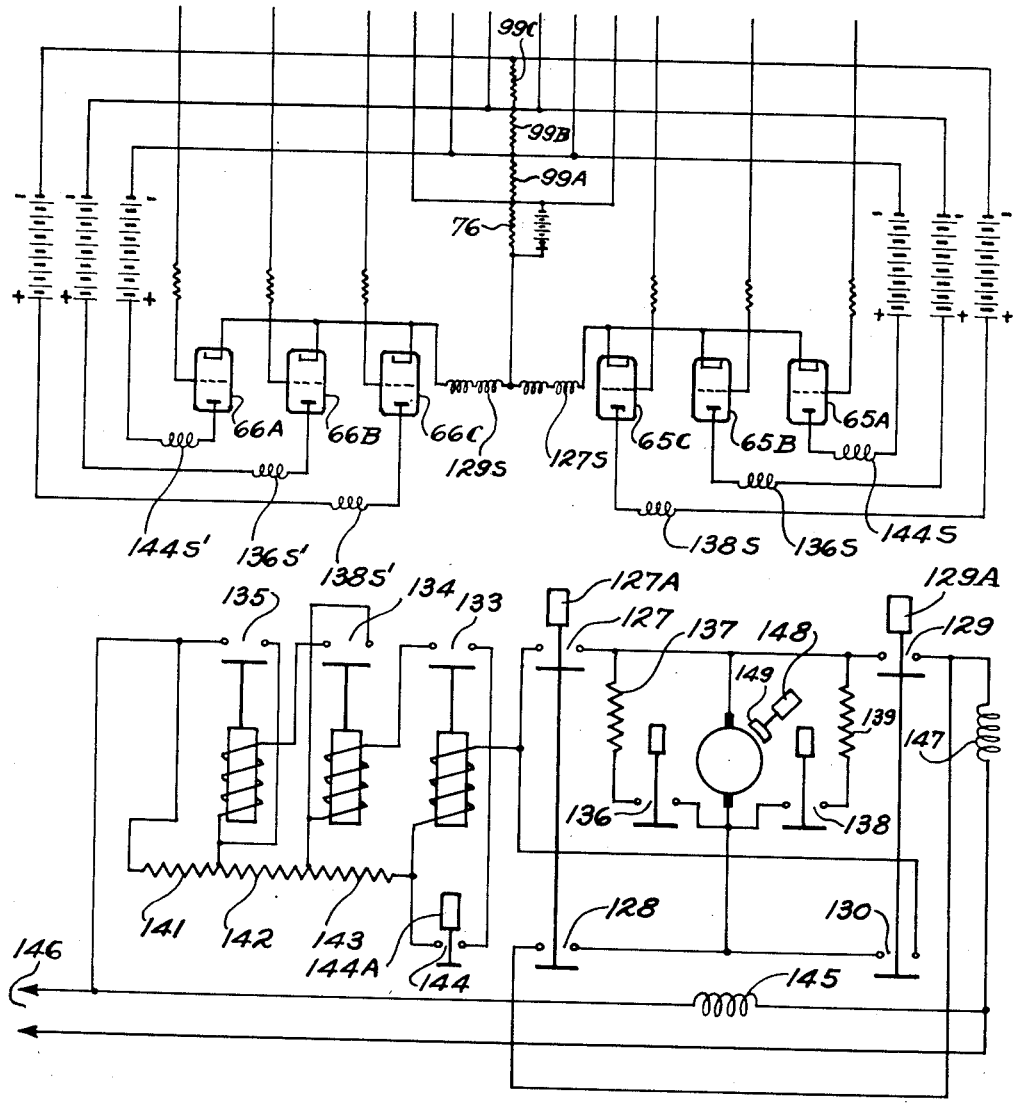
Fig. 23 is a fragmentary circuit diagram, partially schematic illustrating a remote positioning system in accordance with my invention in which a contactor controlled servomotor is utilized in place of motor generator control.

My invention has been described for the sake of illustration in connection with the use of a servomotor controlled by controlling field excitation of a motor-generator or Ward Leonard system through a dynamo electric type direct-current amplifier. It will be understood, however, that my invention is not limited thereto and includes use of any desired type of motor control system controlled in turn by my novel servo amplifier channels and keyboard system. For example, as illustrated in Fig 23, the three-channel servo amplifier circuit illustrated in Fig. 19 utilizing control transformers in accordance with my invention may be utilized also for operating a servomotor having a contactor control system of a conventional type utilizing automatic accelerating relays. Since the synchrorepeater units and the discriminator units are connected in the same manner as in Fig. 19 these portions of the system are omitted from Fig. 23, which is in fragmentary form showing the control electrode connections to the power amplifiers 65A, 65B and 65C, and 66A, 66B and 66C. As in Fig. 19, the power amplifier tubes are provided with common cathode resistor circuits through the common cathode resistors 76 and 99A. The cathode resistor 99B is common to two channels; and the cathode resistor 99C is included in the cathode circuit of only the finest channel tubes 65C and 66C.

Since no amplidyne or direct-current dynamo-electric amplifier is employed in the arrangement of Fig 23, the amplidyne field windings 68 and 69 have been replaced by the solenoid windings of directional control relays, or the solenoid windings of contactors controlling armature connections of the servomotor 16.

As shown in Fig. 23, the servomotor 16 is provided with a pair of contactors 127 and 128 adapted to be closed for the forward rotation of the motor 16 and a second pair of contactors 129 and 130 adapted to be closed for the reverse rotation of the motor 16. In order to avoid confusion in the drawing, solenoid windings for the contactors 127 and 130 inclusive have been shown as separate from the armatures of the contactors. However, as illustrated and designated by the reference numerals, the forward contactors 127 and 128 have a common armature 127A with a solenoid winding 127S in the common cathode branch circuit of power amplifier tubes 65A, 65B and 65C. The reverse rotation contactors 129 and 130 with their common armature 129A are provided with an operating solenoid winding 129S in series with the common branch cathode circuit of the power amplifier tubes 66A, 66B and 66C. The motor 16 is started as soon as the synchrorepeater system causes current to flow through any one of the power amplifier tubes thereby energizing either the solenoid winding 127S or 129S which is in the common cathode circuit, and closing the starting and direction control contactors 127 and 128, or 129 and 130. Depending upon whether controls are calling for forward operation or reverse rotation of the motor 16, either the forward contactors or the reverse contactors remain closed as long as current is flowing in any one of the three amplifiers for the desired direction of rotation. In this manner the operation of the directional contactors 127–130 is unaffected by the fact that the coarse channel blocks out the finer channels and the current falls to zero in the coarser channels of the vacuum tube amplifier circuits if the motor 16 has brought the load approximately to the desired position.

In the system of Fig. 23 the coarse control of the motor 16 is obtained by a conventional set of automatic accelerating relays or contactors 133, 134 and 135 of the series, current-limit type well known to those skilled in the art. The intermediate speed operation is obtained by a shunting relay or contactor 136 for shunting a resistor 137 of suitable resistance across the armature of the motor 16 and the fine speed control is obtained by a second shunting relay or contactor 138 for shunting a second resistor 139 of suitable value across the armature of the motor 16 for bypassing a greater amount of armature current.

As in conventional starting systems with automatic accelerating relays, there is a series starting resistor consisting of resistance units 141, 142 and 143 in series with the armature adapted to be shunted out in succession by the accelerating contactors 133, 134 and 135, respectively. The contactors 133, 134 and 135 have the property of being held out as long as the current is above a predetermined value and closing contacts only after the current falls to a predetermined value and remaining closed as long as the current continues above a predetermined small minimum value. If desired there may be a holding contactor 144 with contacts in series with the winding of the accelerating relay 135. Although my invention does not exclude the use of a series motor, for precision speed control in the successive channels a shunt motor is preferably employed with a field winding 145 shunted across a source of direct current 146. There is also a series brake coil 147 adapted to cooperate with a plunger or armature 148 for retracting a spring loaded motor brake 149 so long as motor current is flowing through the winding 147 which is in series with the motor armature.

The operation of the system of Fig. 23 is as follows. Assuming that the key boards 27A, 27B and 27C indicated in Fig. 19 have been set in such a position that the rotor of the synchrorepeater unit 12 is so far from the desired position as to cause the coarse channel forward or reverse power amplifiers 65C or 66C to be actuated, current will flow in one of the power amplifiers. For example, the amplifier 65C is energized causing current to flow through the solenoid windings 127S, 128S and 144. Accordingly the holding contactor 144 will close and likewise the directional control contactors 127 and 128. Voltage from the source 146 is thereby applied to the armature of the motor 16 through the starting resistors 141, 142 and 143, causing current to flow through the winding of the contactor 133. As soon as current has fallen to the limit value, the contactor 133 will close, short circuiting the resistor 143 and causing current to flow through the winding of the contactor 134. Thereupon as soon as current has fallen to the required value, the contactor 134 will close in a similar manner and contactor 135 will close with all the resistors 141, 142 and 143 short circuited and the motor 16 comes up to full speed.

The motor 16 will continue to run at full speed until the load has been brought approximately to the desired position somewhere within the angle represented by the dead space 107 for the coarse channel in Fig. 20. Thereupon the current in the power amplifier 65C falls to zero. However, current is transferred to the power amplifier 65B as represented by the position 102 of the graph of Fig. 20. Current therefore continues to flow through the solenoid winding 127s since the circuit of the winding is common also to the cathode circuit of the tube 65B. Accordingly, the contactors 127 and 128 remain closed.

The intermediate-speed shunting contactor 136 is provided with an armature 136A having a pair of solenoid windings 136 and 136′ in series with the anode leads of power tubes 65B and 66B respectively, either of which is capable of lifting the armature 136A and closing the contact 136. Likewise, the fine speed armature shunting contactor 138 is provided with an armature 138A having a pair of independent solenoid windings 138S and 138S′ in series with the anode circuits of the fine-channel power amplifiers 65A, 66A respectively. Either of these is capable also of lifting the armature 138A to close the contact 138. The holding contactor 144 also has a pair of windings 144S and 144S′ in the anode circuits of tubes 65A and 66A respectively, either of which is capable of lifting the armature 144A.

If the holding contactor 144 is employed, it drops out as the current in the tube 65A begins to fall, so that the resistors 141, 142, 143 are reintroduced in the motor circuit for slow down even prior to the action of the tube 65B. As soon as current flows through the power amplifier 65B, current flows also through the winding 136S to close the contacts 136 for partially shunting the armature of the servomotor 16. This causes the motor 16 to slow down to a reduced speed represented by the altitude of the portion 102 of the graph of Fig. 20. Thereafter when the load has been brought still more closely to the approximately desired position represented by the dead space 108 between the portions 103 and 105 of the graph of Fig. 20, the current falls to zero in the amplifier tube 65B, but is transferred to the power amplifier tube 65A. As before, current continues to flow through contactor winding 127S to keep the contactors 127 and 128 closed so that the motor continues to run. In response to current flowing through the winding 138S of the contactor 138, the fine speed armature shunting contactor 138 closes, bypassing a larger amount of current around the armature of the motor 16 so that its current falls to a still smaller value suitable for precise approach to the stable position represented by the dead space 109 of the graph in Fig. 20. When the stable position has been achieved, the current falls to zero in the power amplifier tube 65A and also in the winding 127S, whereupon the starting contactors 127 and 128 drop out. All current through the motor 16 is cut off, as well as through the brake winding 147. Thereupon the brake winding 147 releases its armature 148, permitting the brake 149 to bring the motor 16 to a complete stop and prevent it from drifting until a new setting of the controls has been made by the keyboards 27A, 27B and 27C so as to reinitiate the process just described.

Other arrangements may also be employed for utilizing the successive power amplifier tube channels to control contactors. For example instead of using automatic accelerating contactors, a series starting resistor may be employed with several resistor units in series having shorting contactors so arranged that each of the power amplifiers for either forward or reverse operation is adapted to control one of the series-resistor shorting contactors for bringing about desired graduations in speed as the servomotor brings the load to its desired position.

Figure 24:
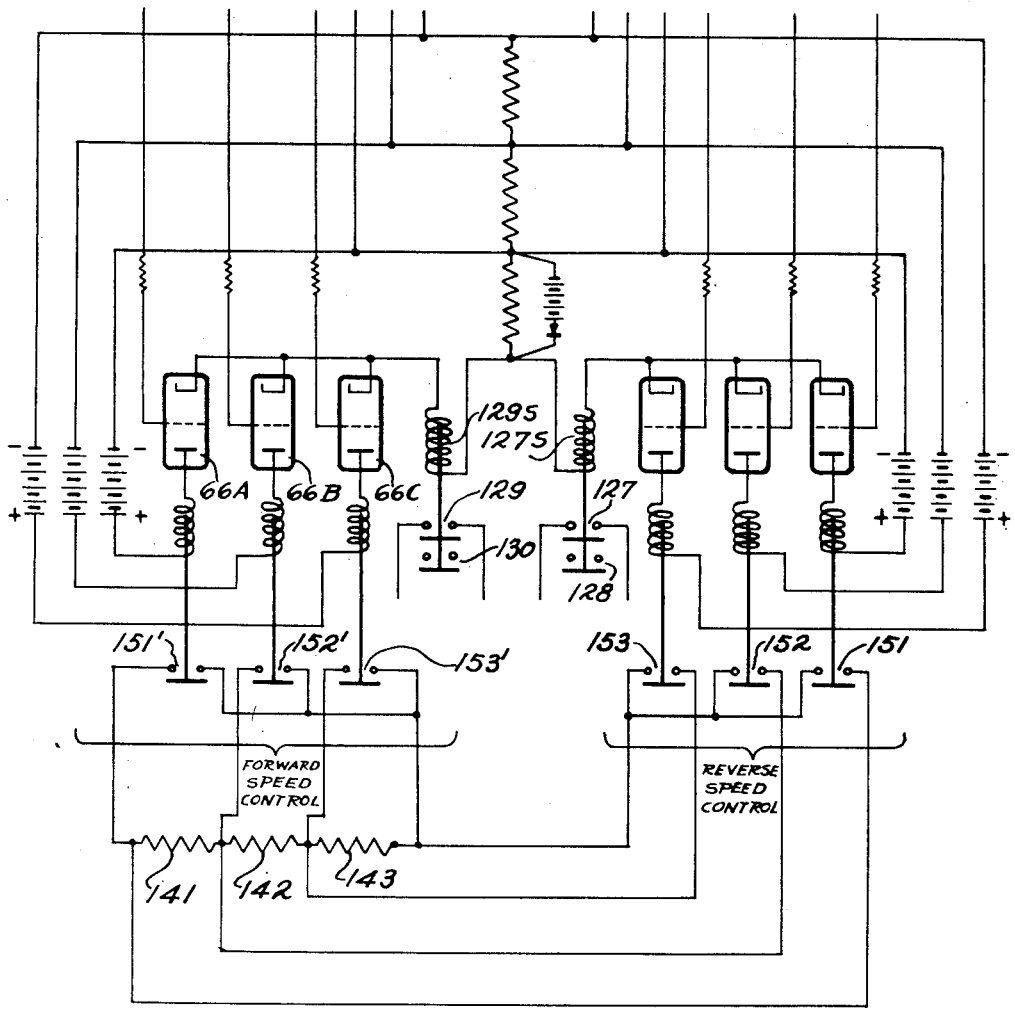
Fig. 24 is a fragmentary circuit diagram of another modification of the arrangement of Fig. 19 in which contactor control of the type utilized with a master switch is employed in place of motor generator control.

The vacuum tube power amplifiers may control the motor 16 with conventional contactor control by connecting each of the power amplifiers to actuate a relay corresponding to the contacts generally needed on master switches for three-speed, forward and reverse. Moreover, the system may be employed for control of power thyratrons or mercury arc rectifiers connected to direct-current motors, or control of A. C. motors, or for control of hydraulic valves and hydraulic pistons actuated mechanisms. As illustrated in Fig. 24, the contactor windings shown in the anode circuits of the power amplifier tubes 65A, 65B, 65C, 66A, 66B and 66C of Fig. 23 are replaced by windings controlling power thyratrons, mercury arc rectifiers, or A. C. motors or windings of solenoid hydraulic valves. They may be windings of contactors controlling a series resistor. There is a plurality of contactors 151, 152 and 153 having their control windings in the anode circuits of the forward control power amplifier tube 65A, 65B and 65C respectively. These contactors may serve, e. g., for successively introducing portions of the series speed control resistors 141, 142 and 143. For reverse rotation speed control, contactors 151', 152' and 153' are provided with solenoid windings in series with the anode circuits of the power amplifier tubes 66A, 66B and 66C respectively. For series resistor control, the contactors 151', 152', 153' have connections to the same points on the series speed control resistor sections 141, 142 and 143 as the contactors 151, 152 and 153.

For simplicity the operation of the power-amplifier circuit of Fig. 24 is described in connection with series resistor contactors, although preferably used in connection with thyratrons, mercury arc rectifiers A. C. motors, hydraulic contactors or the like.

When the amplifier is actuated so as to cause current to flow through one of the coarse-channel power amplifiers 65A, for example, contacts 151 are closed so as to short out all the series speed control resistance and obtain full speed of the motor 16. When the tube 65A ceases to conduct current and the tube 65B starts to conduct current the contacts 65B are closed causing only resistors 142 and 143 to be shorted out. Then as the motor 16 brings the load still closer to the desired position the tube 65B ceases to conduct current and the tube 65C conducts current causing the contactor 152 to drop out and the contactor 153 to close so that only the resistor 143 is shunted out, until the finer channel reaches its position in which current ceases to flow through the power amplifier tube 65C, at which time the contactor 153 opens to introduce the full resistance of resistors 141, 142 and 143 in series with the motor preparatory to the next time the motor started. The forward control contactors 127 and 128 drop out bringing the motor to a stop. It will be understood that suitable means may be provided to limit starting current rush. For example, the relays 151 and 151' may be provided with windings of the time-delay-closing type (the contactors 127, 128, 129, 130 being quick-closing) so as to limit starting current when the coarse channel of the amplifier is actuated and one or the other of the pairs of forward or reverse rotation contactors 127 and 128, or 129 and 130, is energized by the flow of current through the coarse channel amplifier.

Figure 31:
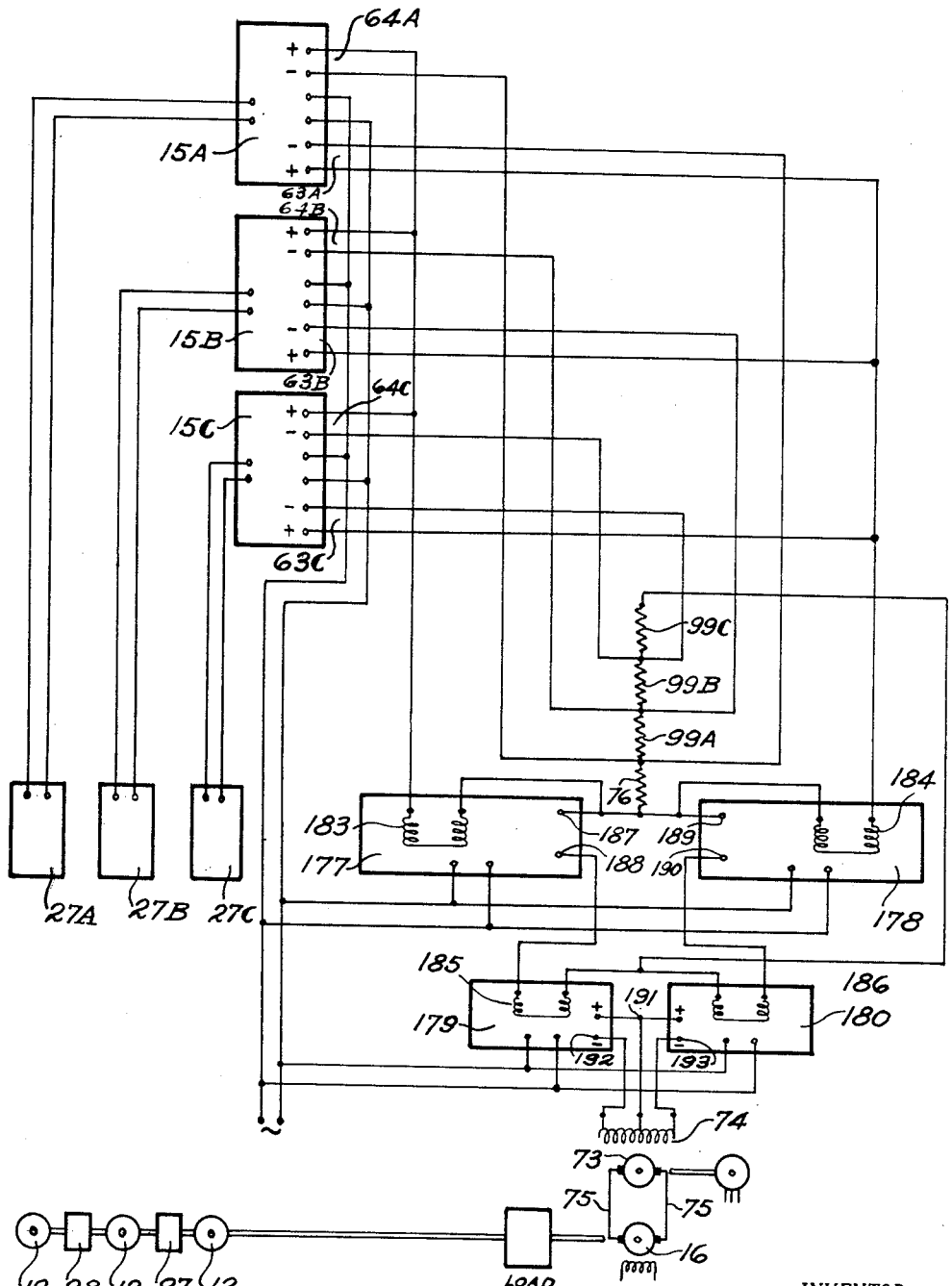
Fig. 31 is a fragmentary circuit diagram of a modification of the arrangement of Fig. 19 in which magnetic amplifiers are employed.

Although the invention has been described primarily in connection with the use of electronic discharge devices and rotary dynamo electric direct-current amplifying means, it will be understood that my invention is not limited thereto. For example, the invention may also be utilized with magnetic amplifiers in place of electronic in the blocking amplifier circuit illustrated in Fig. 19. The use of magnetic amplifiers to form a blocking circuit is illustrated in Fig. 31, wherein the control units and discriminators for the several channels are disposed in the same manner as in Fig. 19. In place of the power amplifier tubes 65a, 65b, 65c, 66a, 66b, 66c, two low-power magnetic amplifiers 177 and 178 are employed for forward and reverse control, respectively, driving two power magnetic amplifiers 179 and 180, respectively. The latter amplifiers are connected to the center tapped field coil 74 of the main generator 73.

The pre-amplifiers 177 and 178 are provided with input control windings 183 and 184, respectively. The amplifier 177 has a pair of output terminals 187 and 188. Likewise the amplifier 178 has a pair of output terminals 189 and 190. Similarly, the power amplifiers 179 and 180 are provided with input control windings 185 and 186. There is a common output terminal 191 of one polarity. For the opposite polarity, output terminals 192 and 193 are provided in the power amplifiers 179 and 180, respectively. It will be understood that separate bias windings are employed which have been omitted for the sake of simplicity, since magnetic amplifiers per se are not my invention.

In the system of Fig. 31 when a signal appears in the coarse discriminator 15a at one of the pairs of output terminals, for example at the output terminals 64a, current circulates in the control winding 183 of the magnetic pre-amplifier 177 and the resistor 76. As a result of this current in the control winding 183, a voltage appears at the output terminals 187 and 188, the magnitude of which depends upon the response curve of the amplifier. The connections are such that this output voltage causes current flowing through the power amplifier input winding 185 and through the resistors 99a, 99b and 99c and 76 to act as a negative feed-back at the terminals of the resistor 76. Moreover, the electrical dimensions of circuit elements are such that the voltages appearing at the terminals 99a and 99b are slightly higher than the voltages appearing as spurious signals at the discriminators of the finer channels 15b and 15c.

As soon as the signal of the discriminator 15a for the coarse channel falls to zero, the signal appearing at the output terminals 64b of the intermediate channel takes over the control of the magnetic amplifier. Voltage at the resistor 99b resulting from amplifier feed-back prevents the fine channel from affecting the control by spurious signals. Finally when the signals of the intermediate channel discriminator or discriminators, if there are more than one immediate channel, have fallen to zero, the fine channel discriminator takes over control of the magnetic amplifier. Thus the operation of the magnetic amplifier accomplishes the same results as the electronic power amplifiers illustrated in Fig. 19.

Figure 32:
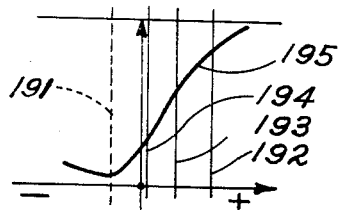
Fig. 32 is a graph illustrating the operating characteristics of the arrangement of Fig. 31.

The operating characteristic of the arrangement of Fig. 31 is illustrated in the graph of Fig. 32 showing the characteristic curve of a magnetic amplifier. Magnetic amplifier output current is plotted along the vertical coordinates against current in the magnetic amplifier input winding, plotted along the horizontal coordinates. A vertical line 191 represents the magnitude of the bias. The intersections of vertical lines 192 and 193 and 194 with the curve 195 represent the points to which the coarse, intermittent and fine channel amplifiers respectively are driven so that each stage serves to block out a succeeding stage.

It will be observed that regardless of the type of amplifier means employed, all embodiments of multichannel operation permit introduction of additional channels without otherwise altering the arrangement. The only condition is that when a finer channel is added the corresponding units must have lower speed and call for smaller voltage. When a coarser channel is added higher current and voltage are required for blocking the amplifier means of subsequent channels. This is the only limiting factor in the number of stages and the precision obtainable.

Figure 25:
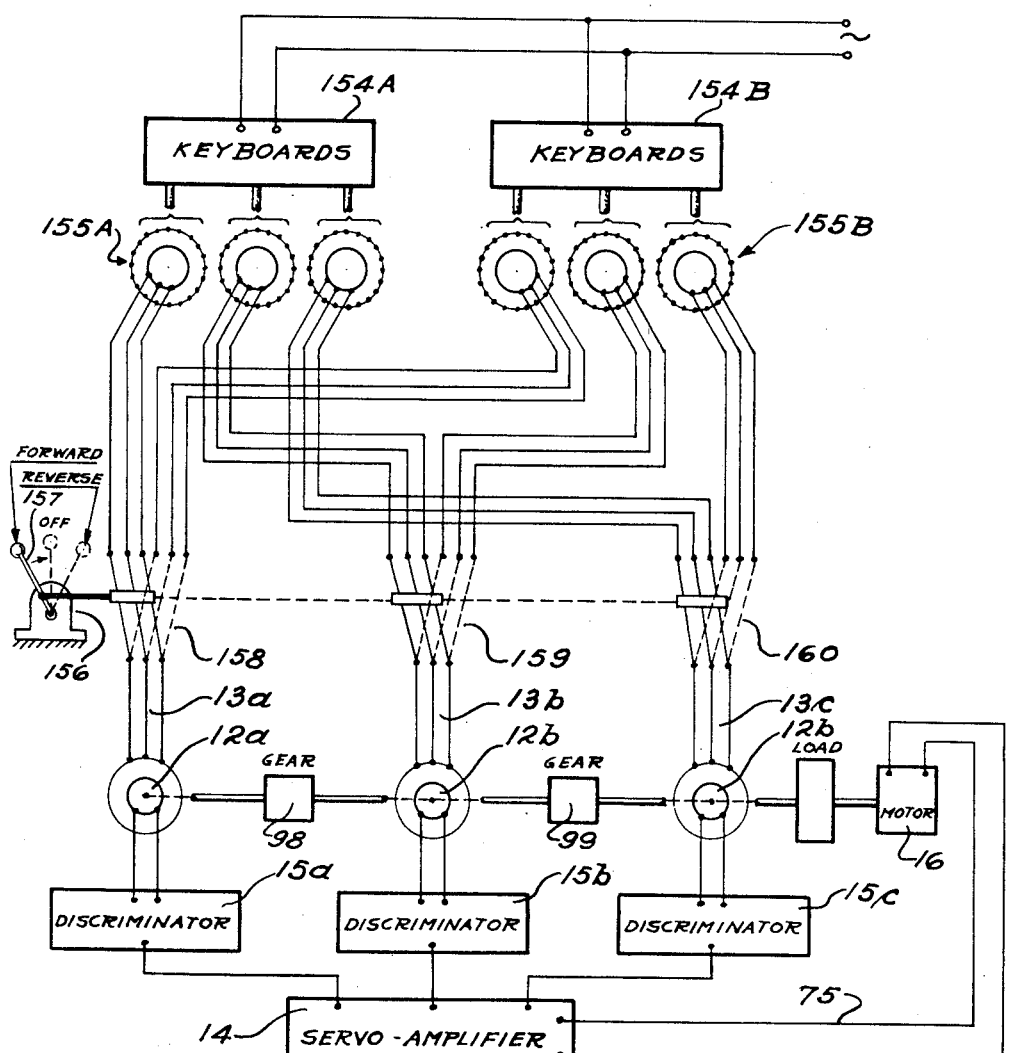
Fig. 25 is a schematic diagram illustrating the manner in which my preset remote positioning system may be employed for presetting a plurality of different positions or as an end limit switch, in which system two end limit positions represent two different preset positions.

Fig. 25 illustrates the manner in which my preset remote positioning system may be employed as an accurate end limit switch for heavily loaded mechanism having high inertia in order to obtain greater accuracy of stopping than available by plugging control with conventional limit switches, and for providing requisite slowing down of the load as the end limit is approached so as to prevent overshooting. As is apparent from the drawings, equally accurate control is obtained at both ends of the travel. If it is desired that both end limit positions be adjustable, two keyboards are provided corresponding to the keyboard 27—41 of Figs. 6, 7 and 8, if a single channel system is sufficient, or corresponding to the keyboards 27A, 27B and 27C of Fig. 14 if a multichannel system is desired, as illustrated in Fig. 25. Assuming that the two desired end limit positions are designated as A and B, there is a keyboard 154A corresponding to keyboards 27A, 27B and 27C for setting position A; and there is keyboard 154B corresponding thereto for setting end limit position B. For each keyboard there are position-control, multiphase transformers 155A and 155B corresponding to the multiphase transformers 21 in Figs. 2 to 4, 6 to 8, 14 and 22.

In order that only three wires need be switched in each channel, the transformer connection of Fig. 7, for example, may be employed, where the multiphase control transformer 21 is connected directly to the alternating current power supply 23. There is a manually operated selector switch or master-controller 156 for producing forward or reverse rotation of the load or for selecting one of a plurality of positions, in this case two positions which have been preset by the keyboards A and B. It will be understood that in the case of reversing control, positions A and B are end positions. The controller 156 includes a control arm 157 operating ganged double-throw switches 158, 159 and 160, each adapted to connect the polyphase transformer leads in each respective channel, to either the control transformers 155A or the control transformers 155B through the interconnecting leads 13a, 13b, or 13c of the corresponding channel to the corresponding synchrorepeater unit 12a, 12b or 12c at the receiving station. Only one set of discriminators 15a, 15b and 15c for the coarser, intermediate and fine channels respectively, are required as well as only one synchrorepeater unit 12a, 12b or 12c for each channel.

The master-controller 156, for simplicity, is shown as having only two positions, forward and reverse, but may be of any conventional design with contacts for accelerating, current limit, and plugging relays if desired. The latter type of master switch permits the use of a conventional motor control just as if the motor voltage bus were a constant voltage bus, except that when the operator approaches the end of the travel the servo system takes care of slowing down and stopping.

If the servo system is used in conjunction with a conventional reversing control the master switch 156 is provided with a double-pole, double-throw, reversing switch 161 (illustrated in Fig. 26) connected with the triple-pole switches 158, 159 and 160, having its reversing contacts interposed in the lines 75 from the output of the servo amplifier 14 to the load driving motor 16.

Figure 27:
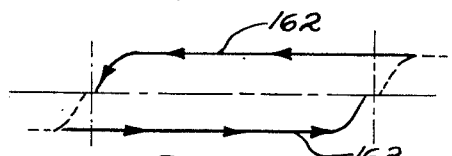
Fig. 27 is a graph illustrating the operating characteristics of the system of Fig. 25.

With the connection shown in Fig. 25, omitting the switch 161 of Fig. 26, the system has two characteristic curves 162 and 163 as illustrated in Fig. 27. The curve 162 represents the characteristics in motion of a load from point B to point A, and the curve 163 represents an operating characteristic moving from the point A to the point B. In Fig. 27 the output voltage of the servo amplifier 14 is plotted along the vertical coordinates against angular motion of the motor 16 plotted along horizontal co-ordinates. The curves 162 and 163 correspond to the curve 86 of Fig. 12A and Fig. 17, curve 163 being reversed with respect to both co-ordinates, being part of a negative loop of a wave displaced angularly from the wave of which curve 162 is a part. The displaced waves are shown separately in Fig. 28, from which it will be observed that any position C for system A is on the right of the stable position 78; and in system B, C is on the left of the stable position 78, corresponding to the stable position 109 of Fig. 20, for a multichannel system.

In the arrangement represented by Fig. 28 the two systems A and B are identical except that one is shifted from the other through an angle $\theta$, the spacing of the end limits. If desired, the system of Fig. 25 may be operated, reversing polarity of the motor bus 75 by use of the reversing switch 161 of Fig. 26 between the output of the servo amplifier 14 and the motor 16. In that case the operation is represented by the diagram of Fig. 29. Operating curves 162 and 163 are both positive. In the arrangement represented by Fig. 29 the point $b$ is not the same as $a$ plus $\theta'$. The polarity of the signal in the output of the amplifier is reversed by inversion of the polarity of the alternating current feeding the system B. Between points $a$ and $b$ the signal of the amplifier is of the same polarity in spite of the switching from system A to system B.

Accordingly, in the arrangement represented by Fig. 29, in order to obtain both forward motion and reverse motion of the load driving motor 16 double-pole, double-throw reversing switch contacts 161, must be included in the controller 156, and the contacts 161 are interposed between the output of the servo amplifier 14 and through the lines 75 to the motor 16. Such an arrangement has the advantage of utilizing a conventional forward and reverse master controller system with the constant voltage bus merely replaced by the servo amplifier and adding an auxiliary relay to the master switch to switch from the keyboard A to the keyboard B according to the direction of motion.

Although the end limit reversing control system has been described in the connection with the use of a multiphase transformer type of position control, it will be understood that my invention is not limited thereto. It will be understood that the advantages of precise control of the end positions automatically and without overshoot as described in connection with Fig. 25 may be accomplished also with a system using driven selsyns as in my U. S. Patent No. 2,560,337 instead of keyboards connected to multiphase control transformers.

As illustrated in Fig. 26, there is a control handle 17A for setting the A position and a control handle 17B for setting the B position. The control handle 17A is mechanically connected to the rotors of transmitter selsyns 11aA, 11bA, and 11cA of respective channels and the control handle 17B is connected to rotors of transmitter selsyns 11aB, 11bB and 11cB of the respective channels. The synchrorepeater units 11A and 11B and 12 are identical and speed reduction gearings 97A, 97B and 98A and 98B are employed corresponding to the speed reduction gears 97 and 98 in the receiving station.

While the invention has been described as embodied in concrete form and as operating in a specific manner in accordance with the provisions of the Patent Statutes, it should be understood that the invention is not limited thereto, since various modifications will suggest themselves to those skilled in the art without departing from the spirit of the invention.

What is claimed is:

1. A remote positioning system comprising in combination transformer means having polyphase windings in inductive relationship to multiphase windings and stationary relative thereto, a synchrorepeater unit comprising a stator and a rotor, one of which carries polyphase windings and the other of which carries a single phase winding adapted to be connected to a source of alternating current, electrical connections between the polyphase windings of the synchrorepeater and the polyphase windings of the transformer means, connections to the multiphase transformer windings including selectively adjustable means for selecting one of a plurality of different space phase relationships between the selected connection on the multiphase winding and the polyphase winding of the transformer means, and means operatively connecting the multiphase transformer connections with the rotor of the synchrorepeater unit.

2. Apparatus as in claim 1 wherein the last mentioned operative connecting means comprises a servo amplifier and a servomotor, the servomotor being mechanically connected to the rotor of the synchrorepeater and the servo amplifier being electrically connected to the selective connecting means of the multiphase transformer windings.

3. A remote positioning system comprising in combination transformer means having polyphase windings and multiphase windings related thereto, said windings being fixed in position relative to each other, a synchrorepeater unit comprising a stator and a rotor, one of which carries polyphase windings and the other of which carries a single phase winding, the polyphase windings being interconnected, the multiphase winding having points therein of different space-phase relationship with respect to the polyphase winding of the transformer means and selectively changeable connecting means for connection to one of said different points according to the angular position desired at the rotor of the synchrorepeater, a pair of terminals for connection to a source of single phase alternating current connected to one of the elements consisting of the single phase winding of the synchrorepeater and the said selectively adjustable connections of the multiphase transformer winding, and operative connecting means between said multiphase transformer windings selective connecting means and the synchrorepeater.

4. Apparatus as in claim 3 wherein the operative connecting means comprise a servo amplifier and a servomotor energized thereby, the servomotor being mechanically connected to the rotor of the synchrorepeater and the servo amplifier having an electrical input connection from one of the two elements consisting of the single phase winding of the synchrorepeater and the selectively adjustable multiphase transformer winding connections, whichever of said two elements is not connected to the said single phase alternating current supply terminals.

5. Apparatus as in claim 3 wherein the operative connections between the multiphase transformer and the synchrorepeater comprises a servo amplifier with input terminals connected to the selectively adjustable connections of the multiphase transformer windings, and a servomotor energized by the servo amplifier and having a mechanical connection to the rotor of the synchrorepeater, the single phase winding of the synchrorepeater being connected to the said alternating current supply terminals.

6. Apparatus as in claim 3 wherein the operative connecting means between the multiphase transformer windings and the synchrorepeater comprises a servo amplifier with input terminals connected to the single phase winding of the synchrorepeater and a servomotor energized by the servo amplifier mechanically connected to the rotor of the synchrorepeater, the said single phase alternating supply current terminals being connected to the selectively adjustable connections of the multiphase transformer windings.

7. Apparatus as in claim 3 in which a vernier transformer is provided for fine adjustment between the positions determined by the selected connections of the multiphase transformer windings, said vernier transformer having a primary winding connected to the single phase alternating current supply terminals and a secondary winding with a center tap and a plurality of taps on either side thereof for selecting a vernier voltage of selected amplitude and polarity, and means for interposing connections from said center tap and one of said selectable side taps in circuit with one of the units consisting of the selectively adjustable conections of the multiphase transformer windings and the single-phase winding of the synchrorepeater.

8. Apparatus as in claim 7 wherein the member of the synchrorepeater carrying the single phase winding also carries a transverse winding to which the vernier voltage connections are made.

9. Apparatus as in claim 8 including a servo amplifier with input connections from selectively adjustable connections of the multiphase transformer windings, and a servomotor energized by the servo amplifier and connected mechanically to the rotor of the synchrorepeater.

10. Apparatus as in claim 3 in which a vernier transformer is provided for fine adjustment between the positions determined by the selected connections of the multiphase transformer windings, said transformer having a primary winding connected to the single phase alternating current supply terminals and a secondary winding with a center tap and a plurality of taps on either side thereof for selecting a vernier voltage of selected amplitude and polarity, the single phase winding of the synchrorepeater unit being connected to the input terminals of the servo amplifier and the multiphase winding for selectively adjustable connections in quadrature, one connected to the single phase alternating current supply terminals and the other to the center taps and one of the selectable side taps of the vernier transformer.

11. Apparatus as in claim 7 wherein the single phase winding of the synchrorepeater is connected to the alternating current supply terminals, a servo amplifier is provided, a servomotor is provided energized by the servo amplifier and mechanically connected to the rotor, the selectively adjustable connections of the multiphase transformer and the vernier voltage connections of the vernier transformer are serially connected to control the servo amplifier.

12. In a remote positioner of the synchrorepeater type having interconnected polyphase windings at control and controlled stations and single-phase excitation, transformer means having a winding in fixed space phase relationship to one of the polyphase windings and an adjustable voltage winding for operative interconnection in one of the single phase energized portions of the system for introducing sufficient unbalance to produce a vernier adjustment in positioning.

13. A multi-channel remote positioning system comprising, in each channel, transformer means having a polyphase winding and a multiphase winding and a synchrorepeater unit having a stator and a rotor, one of which carries a single phase winding and one of which carries a polyphase winding, polyphase windings in each channel being interconnected, the rotors being mechanically interconnected through successive gear reductions for producing coarse adjustment in the slowest speed rotor and fine adjustment in the highest speed rotor, each multiphase transformer having selectively adjustable connections differing in space phase relationship to the polyphase transformer winding, and operative connecting means between such selectively adjustable connections and the synchrorepeater of the same channel.

14. Apparatus as in claim 13 wherein the operative connections in each channel comprises a discriminator, an amplifier and a common servomotor, common to all channels, each servo amplifier having input connections from the channel discriminator and the servomotor being energized by the servo amplifiers and having a mechanical connection to the rotors of the synchrorepeater units.

15. Apparatus as in claim 14 wherein each of the channels is provided with a vernier transformer, interconnected mechanically with the multiphase transformer selective connection means, so that the selection of the multiphase connection simultaneously selects a vernier voltage, each vernier transformer being electrically connected in the channel for the next succeeding closer adjustment.

16. Apparatus as in claim 15 wherein the servo amplifiers comprise independent electrical channels, each corresponding to one of the synchrorepeater channels, each responsive to a different one of the discriminators and include blocking circuits, each responsible to energization of any of the coarser channels for preventing actuation of the finer channels until the synchrorepeater rotor for the next coarser channel has reached the approximate position determined by the selective multiphase winding connection.

17. A multi-channel power amplifier for a multi-channel remote positioner of the synchrorepeater type in which the coarsest channel is of the flat response type and the intermediate channel is of the rising-response type to give fast adjustment in the coarse channel, gradual adjustment in the fine channel and smooth transition from the coarse channel to the fine channel operation, the flat response channel being one having an output varying little over a wide range of variation in input and the rising response channel being one having an output increasing with input substantially more than the flat response channel over a substantial range of variations in input.

18. In a multi-channel remote positioner of the synchrorepeater type having a plurality of repeater channels and a plurality of servo amplifier channels, servo amplifiers of the regulated response curve type having dead zones on either side of a zero error angle position, the dead zones for the coarser channels being relatively wide in comparison with the dead zones of the successively finer channels and the dead zone for each of the coarser channels being less than the spread of a response curve for the next finer channel, whereby commutation in the coarser channel is obtained during the response area of the next finer channel and false reverse rotations of the finer channels are avoided.

19. In a servo system having a synchrorepeater at the controlled station, a direct current motor to drive the load, the synchrorepeater having a rotor mechanically connected to the direct current motor, and having a cross-field winding, a direct-current to alternating-current converter with an input responsive to the speed of the direct-current motor, and an output connected to the said cross-field winding whereby an anticipation effect is produced in the synchrorepeater to minimize overshoot.

20. A remote positioning system employing operatively interconnected synchrorepeater units wherein one of the synchrorepeater units is provided with a cross-field winding energized with current modulated at subfrequency for suppressing hunting caused by residual magnetism.

21. Apparatus as in claim 3 wherein a cross-field of fixed amplitude is effectively induced in the synchrorepeater for compensating back lash.

22. A multi-channel remote positioner having a plurality of servo amplifiers, each for a separate channel, each amplifier being connected as an invert cathode-follower for a preceding amplifier to block operation of one channel until a preceding channel has been positioned.

23. A remote positioning system comprising a transmitter unit, a receiver unit, cascaded amplifier means responsive to deviation between the setting of the transmitter unit and the receiving unit, and a servomotor for driving the receiver unit to a position in accord with the transmitter unit position, said servomotor having a contactor control with independent contactors for producing successive gradations in speed and the amplifier means having successive stages, each including a contactor control circuit for successively energizing the contactors to produce speed gradations, the amplifier stages including coupling means for blocking out successive amplifier stages until the current in each amplifier stage falls to a predetermined level.

24. A control system for presetting end limit positions of a movable load comprising a servomotor for driving a load, a servo amplifier for controlling the supply of current to the motor and thereby controlling the speed and direction thereof, synchrorepeater means for controlling the servo amplifier, first transmitter means for presetting one end limit position, second transmitter means for presetting a second end limit position, and a master controller having selector switch contacts for selectively connecting the synchrorepeater means to one or the other of the transmitter means according to which end limit position is desired for the load.

25. Apparatus as in claim 24 wherein the transmitter and synchrorepeater means are of the selsyn type comprising a stator and a rotor, one carrying a winding for connection to a source of alternating current or to the amplifier input and the other carrying polyphase windings for connection to polyphase lines for interconnecting the synchrorepeater means with the synchrotransmitter means selected by the master switch.

26. Apparatus as in claim 24 in which the synchrorepeater means are of the selsyn type comprising stator and rotor means, one carrying a single phase winding and the other carrying a polyphase winding and the transmitter means are of the multiphase transformer type having a multiphase winding and a polyphase winding with the polyphase winding being adapted for interconnection with the polyphase winding of the corresponding synchrorepeater unit and the multiphase winding having a keyboard for selecting the space-phase relationship between the alternating current excitation and the input signal to the amplifier whereby keyboard setting in each transmitter means determines the end limit position to which the load is driven by the motor under control of a servo amplifier, the amplifier having input terminals connected to one of two elements consisting of the single-phase winding and the multiphase transformer winding, the other of such two elements having terminals for connection to a source of alternating current excitation.

27. In a servo system having a synchrorepeater at the controlled station, a motor to drive a load, the synchrorepeater having a rotor mechanically connected to the motor and having a cross-field winding, a direct-current to alternating current converter with an input responsive to the speed of the motor and an output connected to the said cross-field winding, whereby an anticipation effect is produced in the synchrorepeater to minimize overshoot.

28. In a multichannel remote positioning system having a plurality of synchrorepeaters at the controlled station, one for each channel, a motor to drive a load, each synchrorepeater having a rotor mechanically connected to the motor with successive speed reductions for successive channels, a plurality of said synchrorepeaters having cross-field windings, a direct-current to alternating current converter with an input responsive to the speed of the motor and an output divided and connected to said cross-field windings with different amplitudes each proportional to the speed of the rotor of the synchrorepeater to which such divided output is applied, whereby in each channel the same anticipation effect is obtained or the same point of commutation is provided from a coarser channel to a finer channel.

29. A remote positioning system comprising a transmitter unit, a receiver unit, cascaded amplifier means responsive to deviation between the setting of the transmitter unit and the receiving unit, and a servomotor for driving the receiver unit to a position in accord with the transmitter unit position, said servomotor having a contactor control with independent contactors for producing successive gradations in speed and the amplifier means having successive stages, each including a contactor control circuit for successively energizing the contactors to produce speed gradations, the amplifier stages including coupling means for blocking out successive amplifier stages until the current in each amplifier stage falls to a predetermined level.

30. A multistage remote positioning system comprising movable-element transmitter means, movable-element receiver means, amplifier means responsive to deviation between the movable-element positions of the transmitter means and the receiver means, and a servomotor for driving the receiver means to correspond in position with the transmitter means, said amplifier being coupled to said receiver means with a feed back connection providing progressively greater negative bias for succeeding channels.

References Cited in the file of this patent

UNITED STATES PATENTS

| | | |
|---|---|---|
| 1,999,645 | Wittkuhns | Apr. 30, 1935 |
| 2,464,249 | McCoy | Mar. 15, 1949 |
| 2,508,140 | Blankenbuehler | May 16, 1950 |
| 2,514,983 | Whiting | July 11, 1950 |
| 2,561,654 | Eller | July 24, 1951 |
| 2,614,237 | Goertz | Oct. 14, 1952 |
| 2,620,441 | McCoy et al. | Dec. 2, 1952 |

FOREIGN PATENTS

| | | |
|---|---|---|
| 366,967 | France | Aug. 14, 1906 |